United States Patent
Golan et al.

(10) Patent No.: US 12,342,836 B2
(45) Date of Patent: Jul. 1, 2025

(54) METHODS OF MANUFACTURING PROTEIN-BASED MEAT ANALOGS

(71) Applicant: CHUNK FOODS INC., New York, NY (US)

(72) Inventors: Amos Golan, Tel Aviv (IL); Itay Uri, Kfar Sirkin (IL); Fabio Zon, Tel-Aviv (IL)

(73) Assignee: CHUNK FOODS INC., New York, NY (US)

( * ) Notice: Subject to any disclaimer, the term of this patent is extended or adjusted under 35 U.S.C. 154(b) by 0 days.

(21) Appl. No.: 18/890,175

(22) Filed: Sep. 19, 2024

(65) Prior Publication Data
US 2025/0057184 A1    Feb. 20, 2025

Related U.S. Application Data

(63) Continuation of application No. PCT/US2023/030177, filed on Aug. 14, 2023.

(51) Int. Cl.
*A23J 3/22* (2006.01)
*A23J 3/14* (2006.01)
*A23L 29/00* (2016.01)
*A23L 31/00* (2016.01)

(52) U.S. Cl.
CPC ............ *A23J 3/227* (2013.01); *A23J 3/14* (2013.01); *A23L 29/065* (2016.08); *A23L 31/00* (2016.08)

(58) Field of Classification Search
CPC ............ A23J 3/227; A23J 3/14; A23L 31/00
See application file for complete search history.

(56) References Cited

U.S. PATENT DOCUMENTS

| | | | |
|---|---|---|---|
| 4,265,915 A * | 5/1981 | MacLennan | A23J 3/22 435/933 |
| 10,645,950 B2 * | 5/2020 | Manchuliantsau | A23J 1/148 |
| 11,166,477 B2 * | 11/2021 | Schmidt | A23L 11/50 |
| 2012/0270302 A1 * | 10/2012 | Bayer | A01H 15/00 435/254.1 |
| 2016/0073671 A1 * | 3/2016 | Geistlinger | A23L 27/26 426/61 |
| 2020/0060310 A1 | 2/2020 | Schmidt | |
| 2020/0093155 A1 | 3/2020 | Pattillo | |
| 2020/0268031 A1 | 8/2020 | Macur | |

(Continued)

FOREIGN PATENT DOCUMENTS

| | | |
|---|---|---|
| WO | 2020/092306 A1 | 5/2020 |
| WO | 2020/232347 A1 | 11/2020 |

(Continued)

OTHER PUBLICATIONS

Co-pending application U.S. Appl. No. 18/890,312, filed Sep. 19, 2024.

(Continued)

*Primary Examiner* — Stephanie A Cox
(74) *Attorney, Agent, or Firm* — Momentum IP; Marc Van Dyke

(57) ABSTRACT

Fermented meat analogs and methods of producing such meat analogs, the meat analogs comprising protein-containing strands, and a mycelium of a fermenting microorganism, wherein the protein-containing strands are held together or bound together by the mycelium to form the fermented meat analog.

20 Claims, 21 Drawing Sheets

(56) References Cited

U.S. PATENT DOCUMENTS

| | | |
|---|---|---|
| 2021/0045410 A1 | 2/2021 | Le |
| 2022/0030911 A1* | 2/2022 | Schmidt .................. A23L 31/00 |
| 2022/0095646 A1 | 3/2022 | Soni |
| 2022/0132893 A1* | 5/2022 | Denkel .................. A23J 3/227 |
| | | 426/44 |
| 2022/0232854 A1* | 7/2022 | Nadal ..................... A23L 31/00 |

FOREIGN PATENT DOCUMENTS

| | | |
|---|---|---|
| WO | 2022/034092 A1 | 2/2022 |
| WO | 2022/091089 A1 | 5/2022 |
| WO | 2023/084526 A1 | 5/2023 |
| WO | 2023/094619 A1 | 6/2023 |

OTHER PUBLICATIONS

International Search Report for PCT/IB2023/058187 [dated: Dec. 12, 2023].
International Search Report for PCT/US2023/030177 [dated: Dec. 27, 2023].
Written Opinion of the International Searching Authority for PCT/IB2023/058187 [dated: Dec. 12, 2023].
Written Opinion of the International Searching Authority for PCT/US2023/030177 [dated: Dec. 27, 2023].

\* cited by examiner

FIG. 1G
FIG. 1F
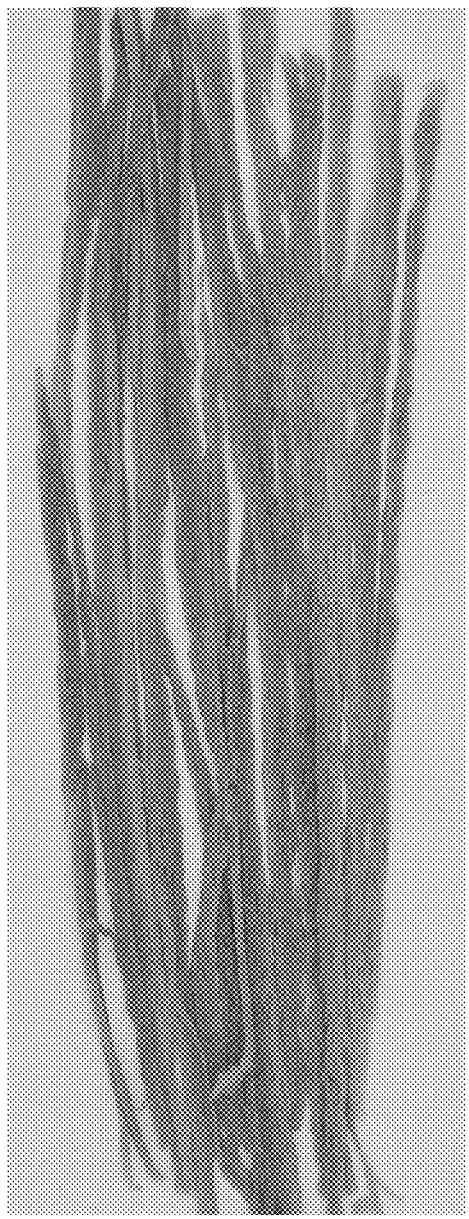
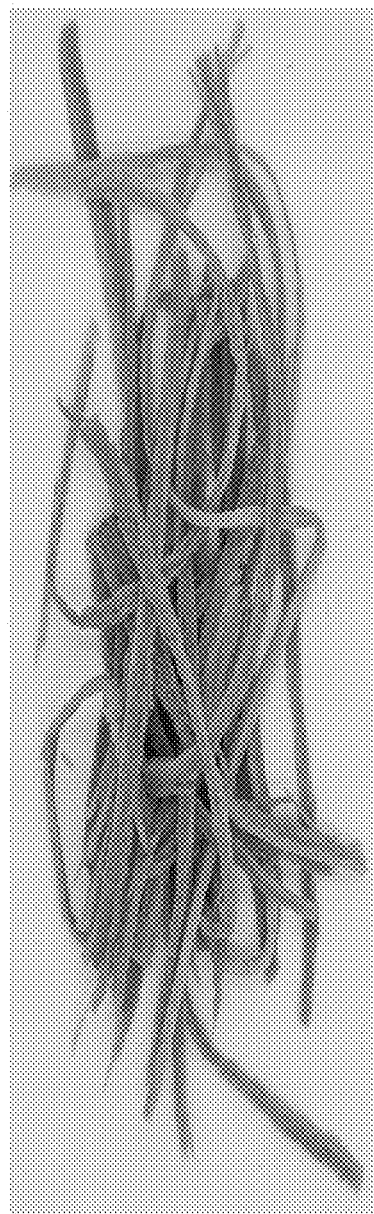

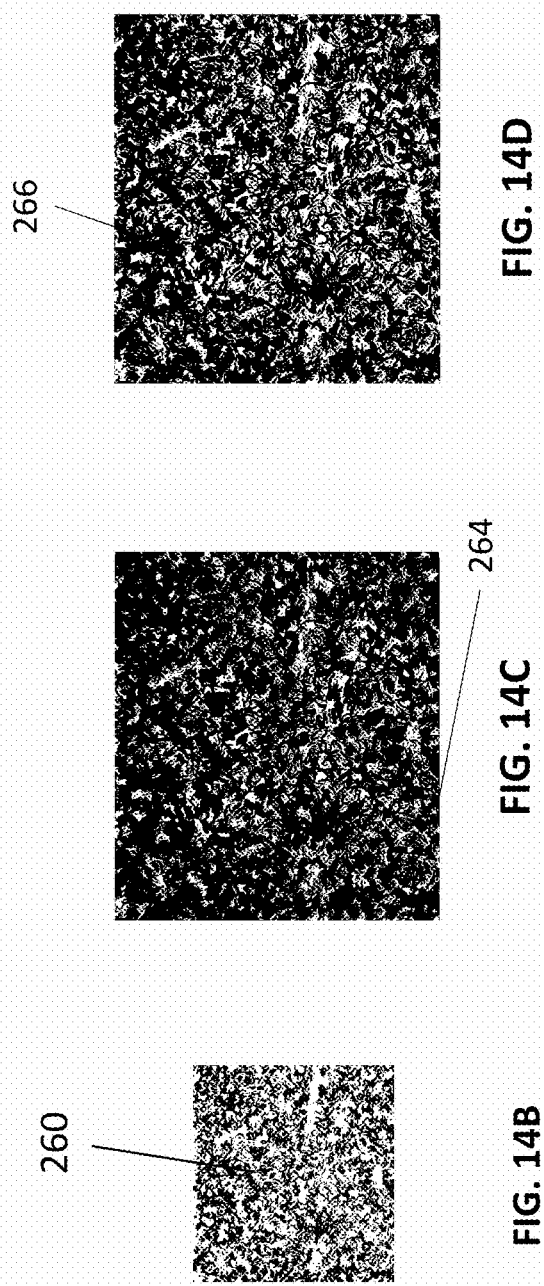

METHODS OF MANUFACTURING PROTEIN-BASED MEAT ANALOGS

CROSS-REFERENCE TO RELATED APPLICATIONS

This patent application is a continuation of PCT/US2023/030177, filed Aug. 14, 2023, which is incorporated by reference herein in its entirety.

FIELD OF THE INVENTION

The present invention relates in general to food items and methods of manufacture thereof, and more particularly, to fermented protein-based meat analogs and methods of manufacture thereof.

SUMMARY OF THE INVENTION

In accordance with aspects of the present invention, there is provided a method of manufacturing a fermented protein-based food item, the method comprising: (a) impregnating, with water, a protein-based substance containing at least 25% protein, by weight, on a dry basis, said protein-based substance including low-moisture extruded vegetable protein; (b) removing water from the protein-based substance; (c) producing protein strands from the protein-based substance, wherein said protein strands have a dimensionless aspect ratio ASP defined by:

$$ASP = L^2/Ax$$

wherein: L is the average length of the long dimension of said protein strands; and Ax is the average radial cross-sectional area of the strand dimensions, transverse to said long dimension; wherein ASP is at least 100, and wherein L is at least 30 mm; (d) inoculating the protein strands with an inoculum including a fermenting microorganism; (e) bundling the protein strands inoculated with the inoculum to produce a bundle of protein strands; (f) placing the bundle of protein strands in a fermentation housing; (g) subjecting the bundle of protein strands to fermentation in the fermentation housing to produce a fermented structure; and (h) treating the fermented structure to produce the fermented protein-based food item; wherein, within the bundle of protein strands, the long dimension of at least 80% of the protein strands is within 30 degrees of an imaginary longitudinal axis of the bundle; and wherein said impregnating and removing are performed such that the water content in the protein strands subjected to fermentation is within a range of 50 to 70%, by weight.

In accordance with aspects of the present invention, there is provided a fermented protein-based meat analog, comprising: fermented protein strands, the longitudinal axes of at least 80% of said fermented protein strands being within 30 degrees of an imaginary longitudinal axis, said fermented protein strands having a dimensionless aspect ratio $ASP_{PROD}$ defined by:

$$ASP_{PROD} = L^2/Ax$$

wherein: L is the average length of said fermented protein strands, each individual strand length taken along the longitudinal axis thereof; and Ax is the average radial cross-sectional area of said fermented protein strands, a radial cross-sectional area of each of said fermented protein strands being perpendicular to the longitudinal axis thereof; wherein $ASP_{PROD}$ is at least 8; and a mycelium of a fermenting microorganism, disposed within said fermented protein strands and therebetween, such that hyphae of said mycelium mechanically bind together the fermented protein strands to form the fermented meat analog; wherein the fermented meat analog contains a plurality of pores disposed within said fermented protein strands, said pores having a short dimension of at least 0.05 mm, and wherein, within a longitudinal cross-section along the long dimension of said fermented protein strands, said pores make up 5 to 25% of the total area of said longitudinal cross-section; and wherein a void fraction within a second, radial cross-section of the fermented meat analog, taken perpendicular to said longitudinal cross-section, is within a range of 5 to 20 area %.

Further aspects and features of the invention are provided hereinbelow.

BRIEF DESCRIPTION OF THE FIGURES

The foregoing discussion will be understood more readily from the following detailed description of the invention, when taken in conjunction with the accompanying Figures, in which:

FIG. 1F provides a photograph of protein strands of the low moisture protein extrudate, disposed in an unaligned orientation;

FIG. 1G provides a photograph of protein strands of the low moisture protein extrudate, disposed in an aligned orientation;

FIGS. 14B, 14C, and 14D are images of steps of the method of FIG. 14A.

DESCRIPTION OF THE PREFERRED EMBODIMENTS

Figure 1:
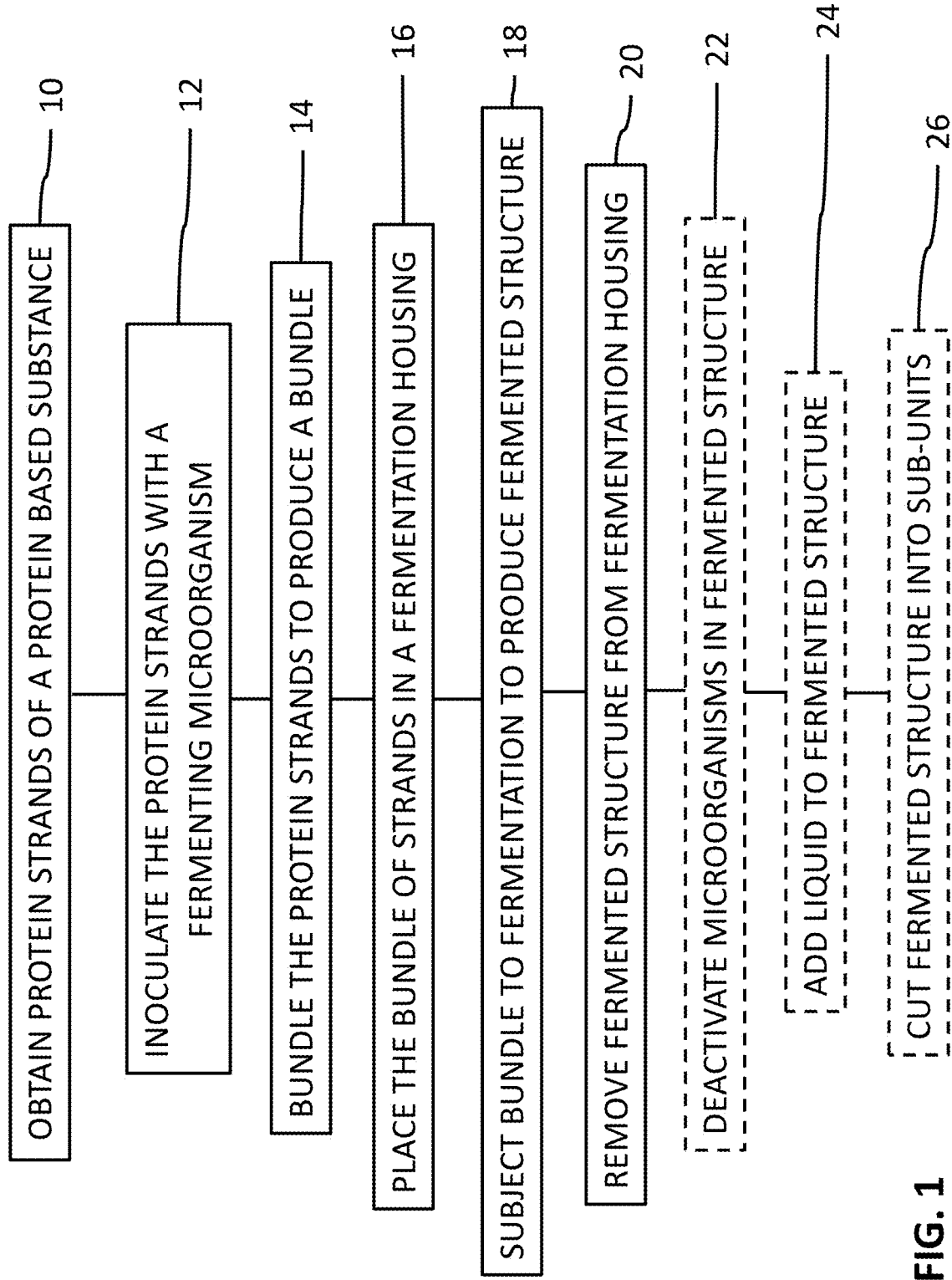
FIG. 1 is a is a flow chart of a method of manufacturing a fermented protein-based meat analog according to embodiments of the disclosed technology.

The principles of the inventive fermented protein-based meat analog and for the method of manufacture thereof, may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is made to FIG. 1, which is a flow chart of a method of manufacturing a fermented protein-based meat analog according to embodiments of the disclosed technology.

As seen at step 10, protein strands are obtained. The protein strands are formed of a protein-based substance.

As used herein in the specification and in the claims section that follows, the term "protein-based" with respect to a component, material, etc. (e.g., "protein-based substance"), refers to a content of at least 20% protein, by weight, on a dry basis.

Similarly, the term "protein strand" refers to an extruded strand containing at least 20% protein, by weight, on a dry basis.

In some embodiments, the protein-based substance contains at least 25% protein, by weight, on a dry basis.

In some embodiments, the protein-based substance contains at least 30%, at least 35%, at least 40%, at least 45%, or at least 50% protein by weight on a dry basis.

In some embodiments, the protein of the protein-based substance includes plant protein. In some embodiments, protein of the protein-based substance predominantly includes, or consists essentially of, plant protein.

In some embodiments, the protein of the protein-based substance includes soy protein, pea protein, lentil protein, bean protein, chickpea protein, fungal protein, fava protein, or wheat protein.

In some embodiments, the protein of the protein-based substance includes gluten.

Typically, the protein of the protein-based substance includes extruded, low-moisture vegetable protein.

In some embodiments, and most typically, the protein of the protein-based substance includes denatured protein.

In some embodiments, the protein of the protein-based substance predominantly includes, or consists essentially of, denatured protein.

In some embodiments, the protein of the protein-based substance includes cross-linked protein. In some embodiments, protein of the protein-based substance predominantly includes, or consists essentially of, cross-linked protein.

Figure 2:
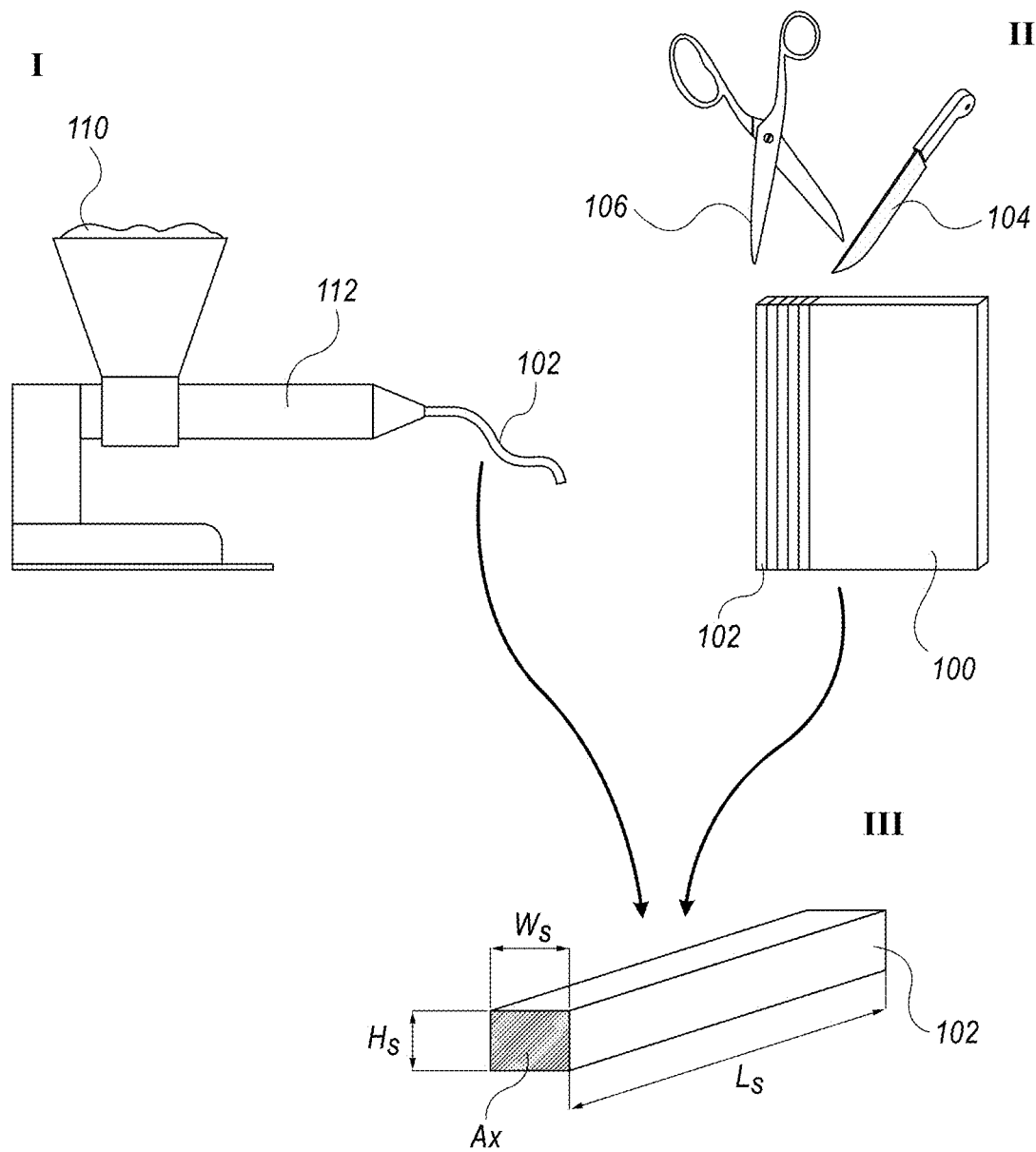
FIG. 2 is a schematic illustration of a step of obtaining strands forming part of the method of FIG. 1 according to embodiments of the disclosed technology.

FIG. 2 illustrates various methodologies for obtaining the protein strands.

In other embodiments, illustrated at area I of FIG. 2, a mixture 110 of a protein-containing raw material is placed in an extruder 112, and a protein-based strands 102 or larger pieces are extruded therefrom, as known in the art of food extrusion.

The extrusion technology may be classified as low-moisture extrusion cooking. In low-moisture extrusion cooking, the moisture content of the extrusion product is typically at most 40% on a weight-weight basis, more typically 5 to 40%, and yet more typically, 7 to 40% or 10 to 40%.

As used herein in the specification and in the claims section that follows, the term "low-moisture extruded vegetable protein", and the like, refers to a vegetable or plant protein produced by such low-moisture extrusion cooking.

In some embodiments, the extrusion product may be a textured protein-based product (TPP) such as a textured soy protein concentrate or isolate.

TPP is made from protein-concentrated food sources that are rich in vegetable protein such as soy protein. Such food sources may include, or consist essentially of, soy flour or defatted soy flour, soy protein concentrate, soy protein isolate, defatted soy flakes and typically contain 40 to 80% protein, on a dry basis. Such food sources may include other protein-concentrated vegetable materials, including, by way of example, at least one of cottonseed, wheat, and oats. The defatted proteins are heated, typically to at least 100° C., and more typically, to at least 120° C., effecting denaturing. The material may then be extruded into various extrudate shapes such as chunks, flakes, nuggets, grains, and strips (shown as protein-based strands 102) and sizes, exiting the die while still hot and expanding during the process. As the pressurized molten protein mixture exits the extruder, the sudden drop in pressure causes rapid expansion into a fibrous, highly porous solid that may then be dried. In some embodiments, the extruded, low-moisture vegetable protein includes, or consists essentially of, textured soy or other vegetable protein.

In some embodiments, illustrated at area II of FIG. 2, a piece 100 of the protein-based substance is cut into protein strands 102, for example using a knife 104, scissors 106, a suitable die, or any suitable cutting mechanism. For example, piece 100 of the protein-based substance may be an extruded piece of the substance.

The resulting protein strands 102 have a long dimension, indicated by $L_S$, a width dimension, indicated by $W_s$, and a height dimension, indicated by $H_s$, in area III of FIG. 2. An average cross-sectional area of protein strands 102, in a direction transverse to the long dimension or to a longitudinal axis of the strand is labeled by Ax and is indicated by hatching in area III of FIG. 2.

In some embodiments, a maximal dimension $D_{max}$ of the height ($H_s$) and width ($W_s$) of strands 102 is in the range of 0.5 mm to 5 mm. This is the maximal dimension in the cross-section of the longitudinal axis of the strands 102. As a matter of convention, $W_s$ is greater or equal to $H_s$ ($W_s \geq H_s$).

In some embodiments, maximal dimension $D_{max}$ is in the range of 0.5 to 4 mm, 0.5 mm to 3 mm, 0.5 mm to 2 mm, or 1 mm to 2 mm.

In some embodiments, $W_s/H_s$ is at least 2:1, at least 2.5:1, at least 3:1, or at least 3.5:1.

In some embodiments, $W_s/H_s$ is within a range of 2:1 to 15:1, 2.5:1 to 12:1, 2.5:1 to 10:1, 2.5:1 to 8:1, 3.5:1 to 12:1, 3.5:1 to 10:1, or 3.5:1 to 8:1.

In particular embodiments, $W_s/H_s$ is within a range of 2:1 to 15:1, 2.5:1 to 12:1, 2.5:1 to 10:1, 2.5:1 to 8:1, 3.5:1 to 12:1, 3.5:1 to 10:1, or 3.5:1 to 8:1, and $H_s$ is within a range of 1.2 to 3 mm. In these particular embodiments as well as other embodiments, $H_s$ may be within a range of 1.5 to 3 mm, 1.5 to 2.5 mm, or 1.2 to 2.2 mm.

Strands 102 have a dimensionless aspect ratio ASP defined by ASP=$L^2$/Ax, where L is an average length of the long dimension L of strands 102, and Ax is the average radial cross-sectional area of the strand.

In some embodiments, ASP is at least 100, at least 250, at least 500, at least 750, at least 1,000, at least 10,000, at least 50,000, or at least 100,000.

In some embodiments, Ax is within a range of 0.25 mm$^2$ to 25 mm$^2$, 1 mm$^2$ to 25 mm$^2$, 2 mm$^2$ to 7 mm$^2$, or 3 mm$^2$ to 5 mm$^2$.

In some embodiments, the average length L of the long dimension $L_S$ of strands 102 produced by, or used in, the process is at least 30 mm, at least 50 mm, at least 100 mm, at least 250 mm, or at least 500 mm.

In some embodiments, L is in the range of 5 mm to 600 mm.

Figure 1A:
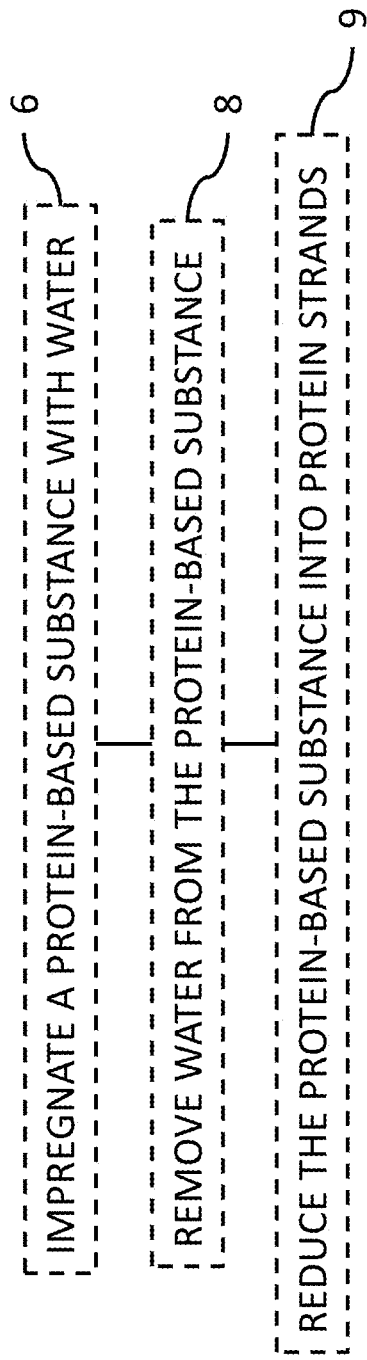
FIGS. 1A and 1B provide additional processing steps for the protein-based raw material utilized in accordance with embodiments of the disclosed technology.
Figure 1B:

These values pertain to protein strands that have been produced according to the teachings of FIGS. 1A and 1B, which provide additional processing steps for the protein-based raw material utilized in accordance with embodiments of the disclosed technology. For example, when the protein-based substance is a low moisture extruded vegetable protein containing a particularly low moisture level, it may be advantageous to first impregnate the protein-based substance with water (step 6) before reducing the protein-based substance into protein strands (step 9 of FIG. 1A, see also FIG. 2).

In some embodiments, the water may be acidified water. Various acids may be suitable for the acidification, including acetic acid, lactic acid, ascorbic acid, malic acid, citric acid, and tartaric acid.

Optionally, and as shown in FIG. 1A, the impregnation step may be followed by a water/liquid removal step (step 8), in which excess water is removed from the protein-based substance.

In some embodiments, the water removal step may be effected by solid-liquid separation equipment.

In some embodiments, the water removal step may be effected by a pressure differential-based solid-liquid separation, e.g., a pressure-based or vacuum-based solid-liquid separation. Examples of such separation equipment include pressure filtration equipment such as a Nutsche Filter, an agitated pressure filter, a pressure filter-dryer, centrifugation, and application of mechanical pressure via soft or hard rollers and the like. Vacuum filtration may also be utilized.

In some embodiments, and as shown in FIG. 1B, the process may include sterilizing the protein-based substance or the protein strands (step 7).

Figures 1C, 1D:
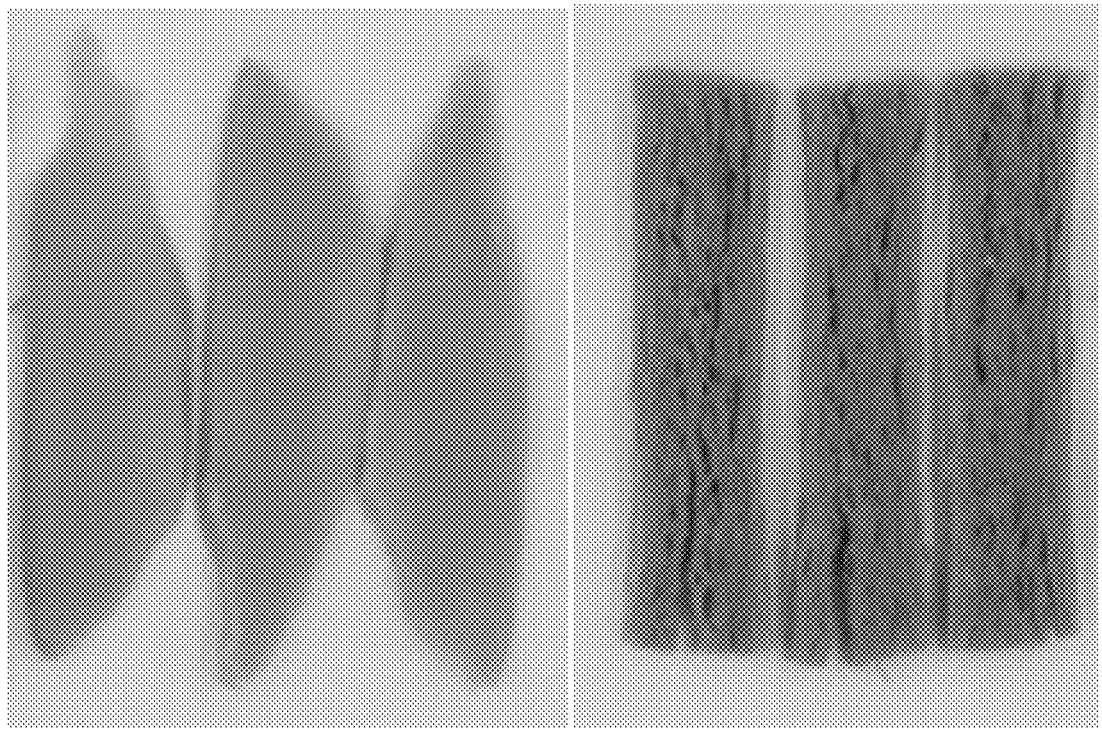
FIG. 1C provides a magnified image of a piece of a high moisture protein extrudate.
FIG. 1D provides a magnified image of a piece of a low moisture protein extrudate, for use in conjunction with the present invention.

With respect to the suitability of protein extrudates for impregnating with water (step 6), FIG. 1C provides a magnified (about 2×) image of a piece of a high moisture protein extrudate, which the inventors have found to be generally disadvantageous as a raw material. Upon viewing FIG. 1C, it is evident that the high moisture protein extrudate contains few—if any—pores that would be visible to the naked eye. By contrast, FIG. 1D provides a magnified (about 2×) image of a piece of a low moisture protein extrudate, which low moisture protein extrudate has been found to be suitable and highly advantageous for use in conjunction with the present invention. Upon viewing the material in FIG. 1D, it is evident that the low moisture protein extrudate is extremely porous, and contains a large number of pores (or the pores represent a large proportion of the piece, on the basis of volume or cross-sectional area) that would be visible to the naked eye.

Figure 1E:
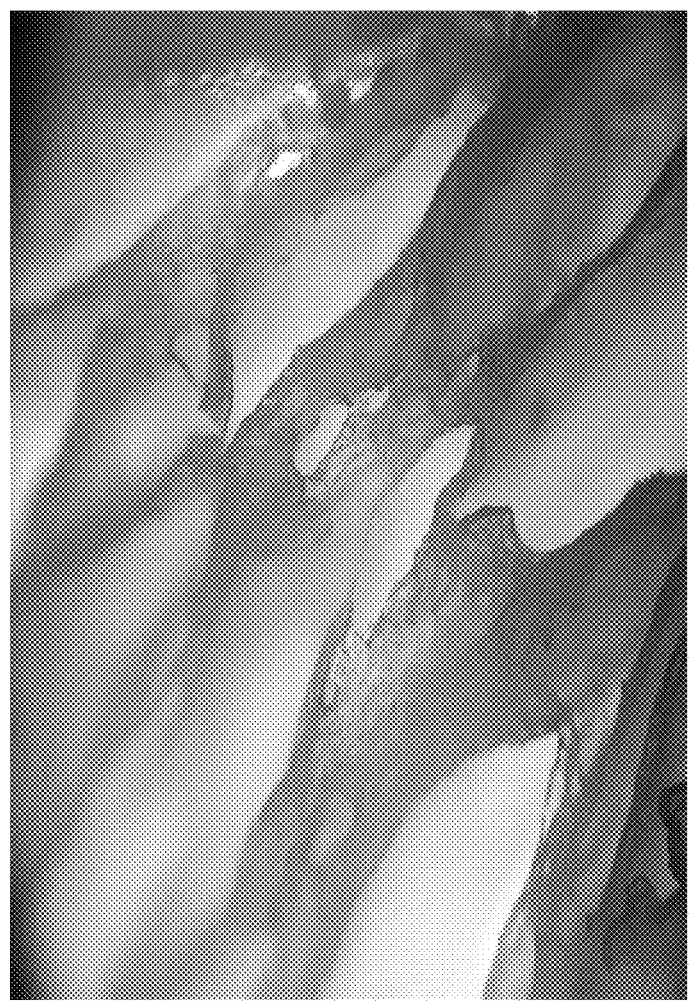
FIG. 1E provides a yet further magnified image of a portion of the low moisture protein extrudate provided in FIG. 1D.

FIG. 1E provides a yet further magnified image of a portion of the low moisture protein extrudate provided in FIG. 1D, in which the high porosity of the low moisture protein extrudate is yet further apparent.

With reference once again to FIG. 1, at step 12, a piece 100 of the the protein-based substance or protein strands 102, or the protein strands produced at step 9 may be inoculated with an inoculum including a fermenting microorganism.

Reference is now additionally made to FIGS. 3A, 3B, 3C, and 3D, which are schematic illustrations of various implementations of inoculating step 12.

Figure 3A:
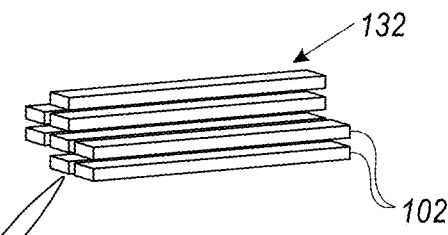
FIGS. 3A, 3B, 3C, and 3D are schematic illustrations of various implementations of an inoculating step forming part of the method of FIG. 1, according to embodiments of the disclosed technology.

In some embodiments, the inoculum may be blown from a blower 130 onto protein-based substance 100 or 110 (shown in FIG. 2), onto strands 102, or onto and/or into a bundle 140 of strands 102, as illustrated in FIG. 3A. Similarly, a liquid suspension of the inoculum may be sprayed onto and/or into the bundle. In some such embodiments, inoculation step 12 may occur following a bundling step, described hereinbelow.

Figure 3B:
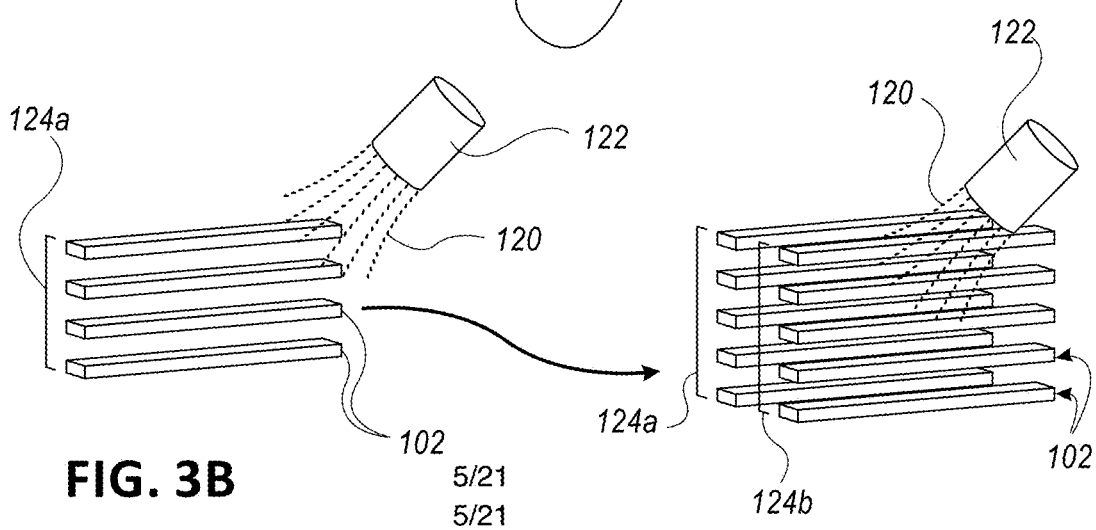

In some embodiments, the protein strands are inoculated, as shown in FIG. 3B. In some embodiments, the inoculation of the protein strands may be in a layer-by-layer manner. For example, inoculum 120 may be sprinkled or applied from a container 122 onto a vertical layer 124a of protein strands 102. A second vertical layer 124b of protein strands is placed above the inoculated strands of layer 124a, and additional inoculum 120 is sprinkled thereon from container 122. The process may be repeated for as many layers as desired. For example, the process may be repeated for 1 to 200 layers, and more typically, for up to 50 layers. Alternatively, the inoculum may be deposited upon horizontal layers in a layer-by-layer manner.

In some embodiments, the inoculation of the protein strands may be performed on a small number of layers, e.g., on a single layer, for example, on a surface such as a thin plastic surface. This surface may then be rolled or otherwise manipulated to produce a bunch of strands.

In some embodiments, the inoculum is sprinkled only on a single side, or face, of each of strands 102, and the layering of the strands ensures that, for most of the strands, the inoculum impacts at least two sides, or faces, of the strands.

The inoculum may be sprinkled onto strands 102 in a less organized, not layer-by-layer, manner. Various fermentation processes mix the inoculated substrate particles or pieces in order to more evenly distribute the fermenting microorganism on the surfaces thereof. Such a mixed group of protein strands, having a relatively unaligned orientation, is shown in FIG. 1F.

By contrast, FIG. 1G provides a photograph of protein strands of the low moisture protein extrudate, disposed in a relatively aligned, unmixed orientation. While the distribution of the fermenting microorganism on the surfaces of the unmixed strands may be far from uniform, the inventors have surprisingly discovered that this apparent disadvantage may not appreciably detract from fermentation performance. This finding allows for assembling and maintaining an aligned protein strand configuration having directional orientation of the longitudinal axes of strands 102 without appreciably detracting from the fermentation process. As an additional result, the bundles of strands produced may have appreciably more even thickness and density, which further improves the fermentation process.

Figure 3C:
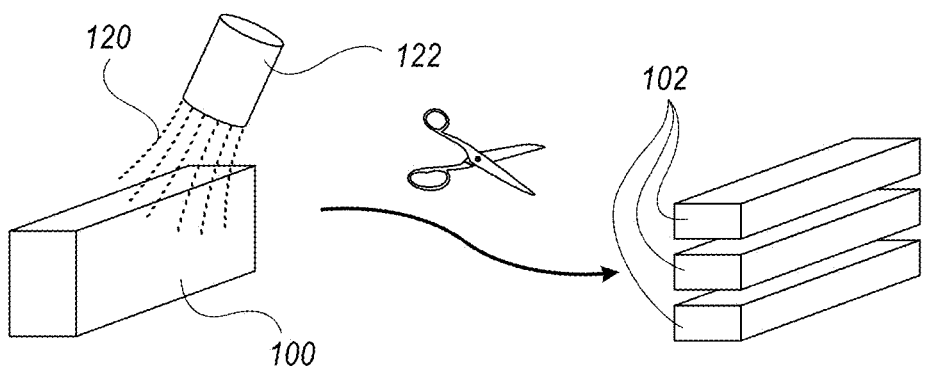

In some embodiments, inoculum 120 may be scattered onto piece 100 of the protein-based substance prior to cutting thereof into strands 102, as shown in FIG. 3C. In such embodiments, step 12 of Figure I would occur prior to step 10.

Although FIGS. 3B and 3C illustrate a powder-phase inoculum being sprinkled, or scattered, onto the strands or the protein-based substance, it will be appreciated that in an alternative or additional method, a liquid-phase suspension containing the inoculum may be sprayed onto the strands or the protein-based substance.

Figure 3D:
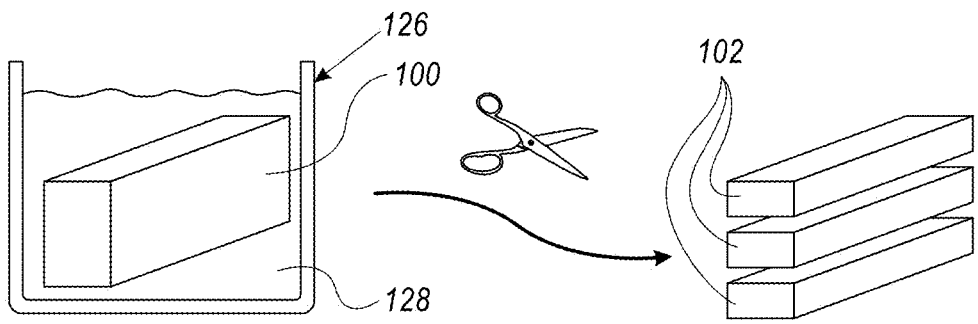

In some embodiments, strands 102 of the protein-based substance may be dipped into a receptacle 126 having disposed therein a liquid suspension 128 including the inoculum, as illustrated in FIG. 3D.

In some embodiments, in which strands 102 are dipped into liquid suspension 128, the strands may be dipped in a layer-by-layer manner as described hereinabove with respect to FIG. 3B.

In some embodiments, following inoculating step 12, the inoculum covers a surface area of protein strands 102 in the range of 5% to 95%, 10% to 95%, 15% to 95%, 15% to 90%, 15% to 85%, 15% to 80%, 20% to 80%, or 30% to 80%.

The inventors have found that the coverage of the strands by the inoculum must be sufficient to ensure effective fermentation, as described hereinbelow. However, the inventors have found that using high coverage ratios may actually be deleterious to the fermentation process, particularly at high concentrations of the fermenting microorganism within the inoculum.

In some embodiments, in addition to the fermenting microorganism, the inoculum further includes at least one dilution agent. In some embodiments, in which the inoculum is in a powder phase, the dilution agent(s) may include soy flour, pea flour, defatted soy flour, wheat flour, corn starch, tapioca starch, potato starch, silica, sugar, salt, maltodextrin, fibers, gluten, rice flour, potato starch, and the like.

In some embodiments, in which the inoculum is in a liquid phase, the dilution agent(s) may include a liquid, such as water, a liquid edible oil or emulsion thereof, alcohol (ethanol etc.), or glycerin, with or without surfactants.

In some embodiments, the fermenting organism is a binding structure forming organism. In some embodiments, the binding structure forming organism is a mycelium forming organism, and the binding structure is mycelium.

For the purpose of the present application, a mycelium forming organism is an organism that forms interwoven filamentous hyphae. For example, the mycelium forming microorganism may be a mycelium forming fungus, such as *Aspergillus Oryzae* or *Sojae, Rhizopus Oligosporus, Rhizopus Oryzae*, edible *Neurospora* strains such as *Neurospora Cressa*, edible gourmet mushrooms, for example *Agaricus bisporus, Schizophyllum commune, Ganoderma lucidum*, or *Pleurotus ostreatus*.

As another example, the fermenting microorganism may be a polysaccharide forming bacteria, such as *Bacillus subtilis*.

Figure 4:
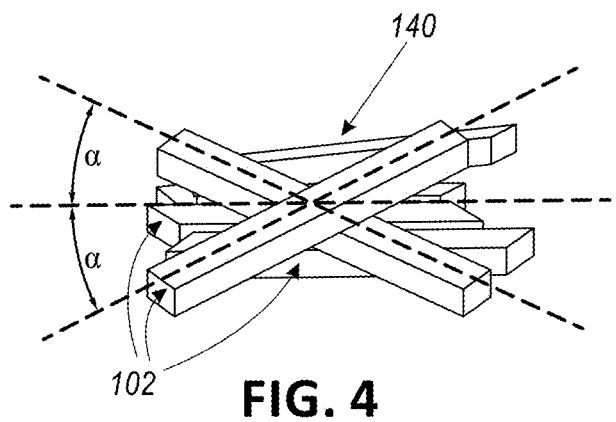
FIG. 4 is a schematic illustration of a bundling step forming part of the method of FIG. 1, according to embodiments of the disclosed technology.

Returning to FIG. 1, at step 14, protein strands 102 are bundled, to produce a bundle of strands 140. Bundle 140 is shown in FIGS. 3A and 4. Bundling of the protein strands may be carried out in any suitable way, such as manually gathering the strands into a bundle, picking up a base surface on which the strands are placed to form the bundle, using a machine to gather the strands into a bundle.

Within the context of the present specification and the claims that follow, the term "bundling" is defined as forming of a pile or stack of items, such as strands, but does not necessitate tying or binding the items together. Similarly, a "bundle" need not be tied together, and may include loosely stacked or piled items.

In some embodiments, bundling step 14 may occur following inoculating step 12. In other embodiments, bundling step 14 may occur prior to inoculating step 12. In such embodiments, the inoculation of the protein strands 102 is carried out within bundle 140, for example as shown in FIG. 3A. In some embodiments, the bundle may be immersed in a liquid inoculum, substantially as shown with respect to a single strand in FIG. 3D.

Typically, during bundling of protein strands 102 to form bundle 140, a directional orientation of the longitudinal axes of at least 80% of the protein strands 102 is maintained.

In some embodiments, a directional orientation of at least 85%, at least 90%, or at least 95% of the strands is maintained. Maintaining of the directional orientation of the strands during the bundling assists in the resulting fermented protein-based meat analog having a directionality to its fibers such that it may structurally resemble animal-based foods, such as meat cuts (in particular, steak cuts) or fish. As articulated hereinabove, such directionality of the strands also assists in maintaining a uniform bulk density which is essential for efficient and uniform fermentation.

In some embodiments, within bundle 140, longitudinal axes of at least 80% of protein strands 102 are within α degrees of the longitudinal axis of the bundle.

In some embodiments, within bundle 140, longitudinal axes of at least 80% of protein strands 102 are within α degrees with respect to the direction of a reference strand. As such, the longitudinal axes of the at least 80% of the strands may be within an angle of +α degrees from the reference strand or −α degrees from the reference strand.

In some embodiments, longitudinal axes of at least 85%, at least 90%, or at least 95% of protein strands 102 are within α degrees of the longitudinal axis of the bundle.

In some embodiments, longitudinal axes of at least 85%, at least 90%, or at least 95% of protein strands 102 are within α degrees with respect to the direction of a reference strand.

In some embodiments, α is within 30 degrees, 25 degrees, 20 degrees, 15 degrees, 10 degrees, or 5 degrees.

In some embodiments, in which the strands 102 are inoculated prior to bundling thereof, bundling of protein strands 102 may cause the inoculum to spread over a greater surface area of the protein strands than that achieved during the inoculating step.

Following the inoculating at step 12 and the bundling at step 14, bundle 140 is enveloped in a fermentation housing at step 16.

In the context of the present specification and claims, a fermentation housing is any container that can contain bundle 140 of protein strands 102 during fermentation. As such, the fermentation housing may be substantially inert to protein strands 102, to the inoculum, and to the fermentation conditions. Additionally, the fermentation housing is at least partially permeable to passage of gas therethrough, for example to enable take-up of oxygen, and release of carbon dioxide, during the fermentation process.

Figure 5A:
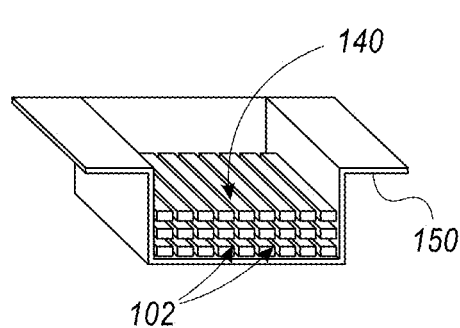
FIGS. 5A, 5B, and 5C are schematic illustrations of various implementations of an enveloping step forming part of the method of FIG. 1, according to embodiments of the disclosed technology.
Figure 5B:
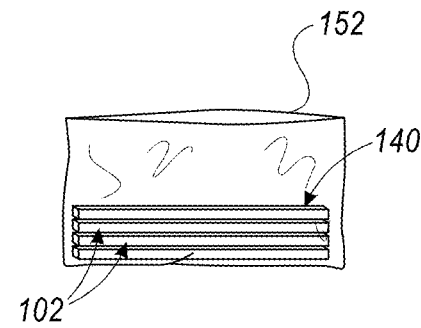
Figure 5C:
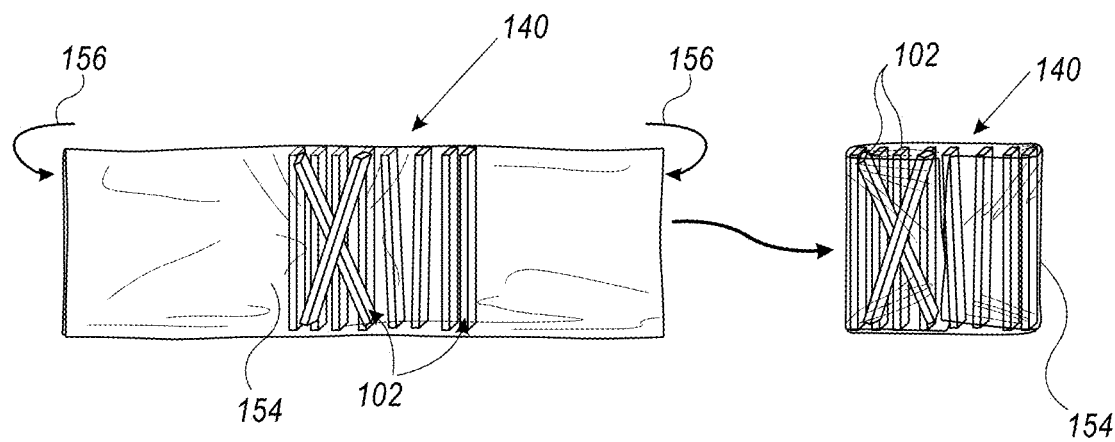

FIGS. 5A, 5B, and 5C are schematic illustrations of various implementations of enveloping step 16, according to embodiments of the disclosed technology.

In FIG. 5A, bundle 140 of protein strands 102 is placed in a mold or pan 150. Mold 150 may be rigid, such as a metal mold, or may be flexible, such as a silicone mold. Mold 150 may fully enclose bundle 140, or may partially envelop bundle 140, as illustrated in FIG. 5A.

FIG. 5B shows bundle 140 of protein strands 102 enveloped within an enclosure 152, which functions as the fermentation housing. For example, enclosure 152 may be a bag (e.g. a plastic bag), an envelope, a rolled-up sheet, or a tray. In the embodiment shown in FIG. 5B, the placing or enveloping step includes pushing bundle 140 into the enclosure 152, and may, in some embodiments, include sealing the enclosure.

FIG. 5C illustrates bundle 140 placed onto a film 154. Film 154 is then wrapped around bundle 140, for example in the directions of arrows 156, so as to at least partially envelop the bundle. In this case, the fermentation housing of FIG. 5C is formed of film 154 wrapped around the 140 bundle. Film 154 may be any suitable type of film, such as a perforated plastic film, perforated aluminum foil, permeable sheet material such as Tyvek™ and the like. Such arrangements may allow appreciable penetration of air or oxygen into the enveloped bundle.

In some embodiments, when using film 154, bundling step 14 and placing/enveloping step 16 may be combined in a single step. For example, if a single layer of inoculated protein strands 102 is placed onto film 154, one may lift the ends of the film to at least partially envelop the strands, and the lifting motion causes the strands to move toward the center of film 154 and form a bundle, prior to fully wrapping the bundle.

In some embodiments, during said enveloping, a directional orientation of the longitudinal axes of at least 80% of the strands is maintained. In some embodiments, the directional orientation of at least 85%, at least 90%, or at least 95% of the strands is maintained. In the context of the present application, the directional orientation of a strand is considered to be maintained if the directional orientation of the strand is within 10 degrees (and more typically 5 degrees) from its previous, or initial, orientation within the bundle.

In some embodiments, during or following the forming or enveloping of bundle 140, the bundle has a bulk density within a range of 0.35 to 0.85 g/cm$^3$. In some embodiments, the bulk density is within a range of 0.4 to 0.85 g/cm$^3$, 0.5 to 0.85 g/cm$^3$, 0.35 to 0.8 g/cm$^3$, 0.35 to 0.75 g/cm$^3$, 0.35 to 0.7 g/cm$^3$, 0.35 to 0.65 g/cm$^3$, 0.35 to 0.6 g/cm$^3$, 0.4 to 0.8 g/cm$^3$, 0.45 to 0.75 g/cm$^3$, 0.5 to 0.7 g/cm$^3$, or 0.55 to 0.65 g/cm$^3$.

In some embodiments, the bulk density is at most 0.8 g/cm$^3$, at most 0.75 g/cm$^3$, at most 0.70 g/cm$^3$, at most 0.65 g/cm$^3$, or at most 0.60 g/cm$^3$.

In some embodiments, the bulk density is at least 0.40 g/cm$^3$, at least 0.45 g/cm$^3$, at least 0.50 g/cm$^3$, at least 0.55 g/cm$^3$.

In some embodiments, during or following enveloping of bundle 140, a water activity of the bundle is at least 0.6, at least 0.65, at least 0.7, or at least 0.75.

Without wishing to be limited by theory, the inventors believe that the bulk density and the water activity of the bundle, at the time of enveloping thereof, are significant for the success of the fermentation.

In some embodiments, enveloping of bundle 140 around protein strands 102 may cause the inoculum to spread over a greater surface area of the protein strands than that achieved during the inoculating or bundling step.

In some embodiments, following the bundling or enveloping, the inoculum covers at least 0.1% of a total cumulative surface area of the strands.

With reference again to FIG. 1, at step 18 the bundle 140 within the housing is subjected to fermentation, in order to produce a fermented structure. In the context of the present application and claims, the term "subjecting to fermentation" is defined as providing conditions suitable for the fermenting microorganism to carry out fermentation of substances included within strands 102, or to grow on or around such strands. The conditions may include suitable humidity conditions, suitable temperature conditions, suitable access to oxygen or air flow, time allowed for fermentation, and the like. The specific conditions may differ depending on the specific fermenting microorganism used.

Figure 6:
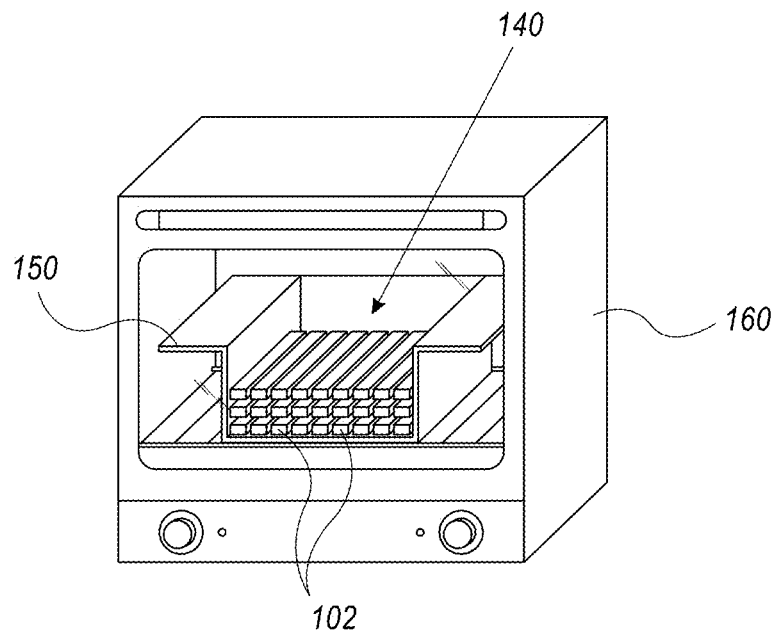
FIG. 6 is a schematic illustration of a fermentation step forming part of the method of FIG. 1, according to embodiments of the disclosed technology.

FIG. 6 is a schematic illustration of fermentation step 18. In FIG. 6, mold 150 with bundle 140 disposed therein may be placed in a fermentation chamber 160.

For example, when using *Bacillus subtilis* as the fermenting microorganism, the fermentation chamber/container may be maintained at 38-45° C., and suitable conditions may be provided for a duration of approximately 24 hours.

As another example, when using *Aspergillus oryzae* as the fermenting microorganism, fermentation chamber may be maintained at 27-35° C., and suitable conditions may be provided for a duration of approximately 48 hours.

Significantly, the fermentation is typically conducted under natural aeration, i.e., without the forced introduction of air, oxygen and the like into the fermentation housing, e.g., by means of tubes. While natural aeration includes applying an oxygen-enriched environment to the fermentation process, the inventors have found that natural aeration using ambient air is sufficient, which greatly simplifies the process with respect to processes requiring forced aeration. Moreover, the inventors have found that forced aeration may actually be deleterious to the inventive process, in that it may dry out the product and/or result in excessive sporulation.

Returning to FIG. 1, following fermentation, the fermented product is removed from the fermentation housing at step 20.

In some embodiments, following fermentation step 18, the fermented structure has a void fraction in a range of 5-40%. In some embodiments, the void fraction is in the range of 8-35%, in the range of 10-30%, in the range of 6-30%, in the range of 6-26%, in the range of 6-24%, in the range of 8-26%, in the range of 10-26%, in the range of 12-26%, in the range of 10-24%, in the range of 12-24%, in the range of 8-22%, in the range of 10-22%, or in the range of 14-26%.

An exemplary method of computing the void fraction of a fermented structure is provided hereinbelow with respect to FIGS. 14A to 14D.

In some embodiments, following fermentation, the fermented structure may be treated in various ways, to obtain the fermented meat analog.

In some embodiments, the treatment following fermentation includes deactivation of the fermenting microorganism in the fermented structure, at step 22. For example, deactivation of the fermenting microorganism may be carried out by application of dry heat, excessive cold, steam, UV irradiation, microwave energy, pasteurization including high-pressure pasteurization, gamma radiation, acid, base, ethanol, fumigation (e.g. with gas), sterilization (e.g. with a liquid chemical) or the like, to the fermented structure.

Figure 7:
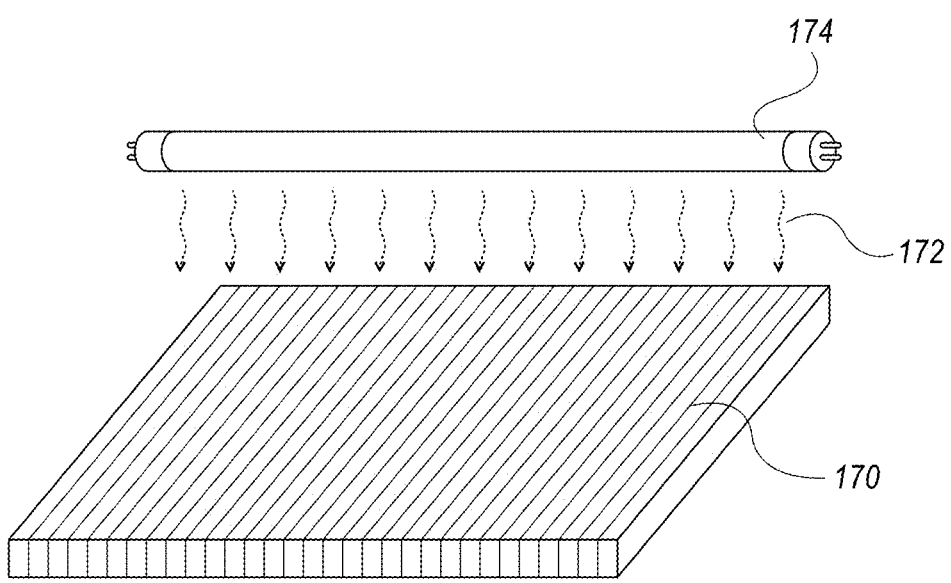
FIG. 7 is a schematic illustration of a microorganism deactivation step forming part of the method of FIG. 1, according to embodiments of the disclosed technology.

FIG. 7 is an exemplary illustration of irradiation of fermented structure 170, which has been removed from the fermentation housing, with gamma radiation 172, emitted, for example, from a gamma radiation source 174.

In some embodiments, following deactivation of the fermenting microorganism, the fermenting microorganism remains whole in the fermented structure, and is merely deactivated. In other embodiments, the deactivation process may break down the fermenting microorganism, such that only components of the fermenting microorganism, or residue of the fermenting microorganism, remain within the fermented structure. In some embodiments, the treatment may include addition of liquid to the fermented structure, at step 24.

In some embodiments, the addition of liquid may be carried out following deactivation of the fermenting microorganism at step 22.

In some embodiments, the addition of liquid may be carried out prior to deactivation of the fermenting microorganism.

In some embodiments, the addition of liquid may be carried out following removal of the fermented product from the fermentation housing, such as when deactivating step 22 is skipped.

Figure 8:
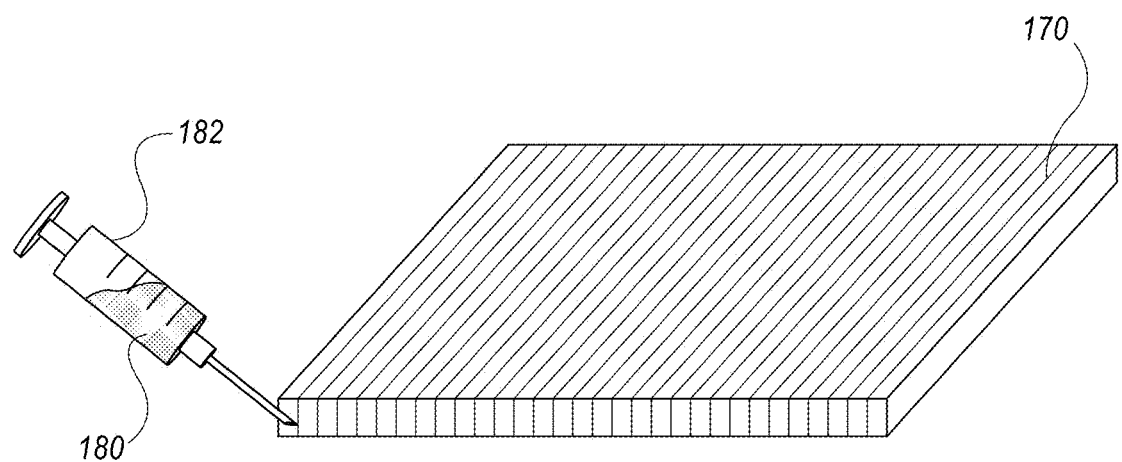
FIG. 8 is a schematic illustration of a liquid addition step forming part of the method of FIG. 1, according to embodiments of the disclosed technology.

The liquid may be added by any suitable means, such as by injection, marinating, soaking, cooking in a aqueous liquid, and cooking in fat. For example, in FIG. 8, liquid 180 disposed in a syringe 182 is injected into the fermented structure 170.

In some embodiments, the added liquid is absorbed in a matrix formed by the deactivated fermenting microorganism or residue thereof and the protein strands.

In some embodiments, following the addition of liquid, a liquid content of the treated fermented structure is in the range of 50-85%, by weight. In some embodiments, the liquid content of the treated fermented structure is in the range of 55-85% by weight, in the range of 60-85% by weight, in the range of 60-80% by weight, or in the range of 60-75% by weight.

In some embodiments, the liquid may be, or may include, an aqueous liquid. In some embodiments, a weight of the added aqueous liquid is within a range of 15-50% by weight of the fermented product to which the liquid is added, prior to the addition of the aqueous liquid. In some embodiments, the added aqueous liquid has a weight within a range of 20-45%, or 25-40% by weight of the fermented product, prior to the addition of the aqueous liquid.

In some embodiments, the liquid may be, or may include, a fat-containing liquid.

In some embodiments, the fat-containing liquid may be a hydrophobic liquid.

In some embodiments, the fat-containing liquid may be a lipophilic liquid.

In some embodiments, the fat-containing liquid may contain at least 10%, at least 15%, or at least 30% fat, by weight.

In some embodiments, a weight of the added fat-containing liquid is within a range of 1% to 20% by weight relative to the fermented product, prior to the addition of the liquid. In some embodiments, the added fat-containing liquid has a weight within a range of 1% to 15%, 1% to 10%, 1% to 8%, 2% to 8%, 3% to 8%, 3% to 6%, or 3% to 5% by weight of the fermented product, prior to the addition of the fat-containing liquid.

In some embodiments, the liquid may be, or may include, a coloring agent or a flavoring agent.

In some embodiments, the method may terminate following the addition of liquid to the fermented product at step 24. In such embodiments, the treated fermented product is the fermented protein-based meat analog.

In some embodiments, the fermented product, the treated fermented product, and/or the fermented protein-based meat analog has a minimal dimension of at least 2 cm, at least 2.5 cm, or at least 3 cm. In some embodiments, the minimal dimension is at least 3.2 cm, at least 3.5 cm, at least 3.8 cm, at least 4 cm, at least 4.5 cm, or at least 5 cm.

In some embodiments, at step 26, the fermented product or the treated fermented product is cut into units, to obtain the fermented protein-based meat analog.

FIGS. 9A, 9B, 9C, and 9D are schematic illustrations of various implementations of cutting step 26, according to embodiments of the disclosed technology.

Figure 9A:
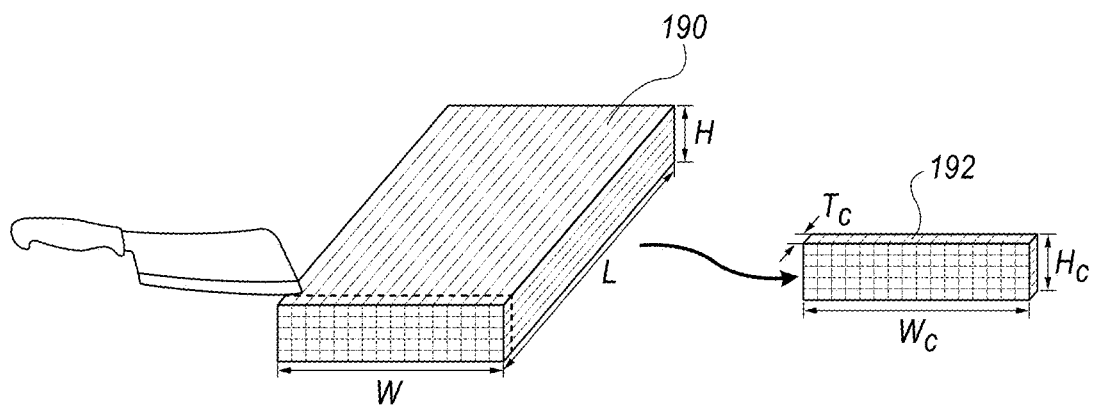
FIGS. 9A, 9B, 9C, and 9D are schematic illustrations of various implementations of a cutting step forming part of the method of FIG. 1, according to embodiments of the disclosed technology.
Figure 9B:
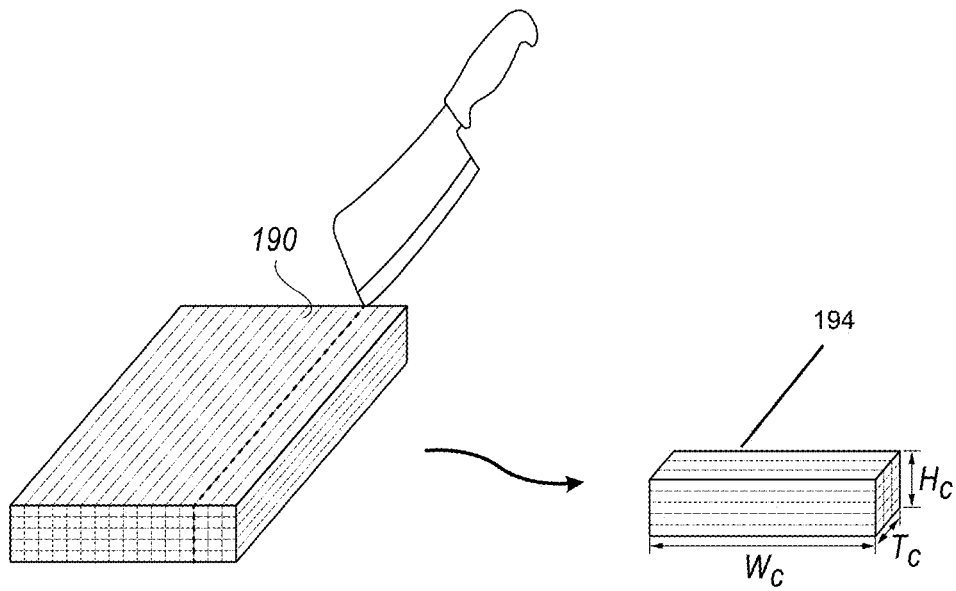

In some embodiments, and as seen in FIGS. 9A and 9B, fermented structure 190 is sliced, to obtain at least two slices. The slicing may be by any suitable means, such as a knife or a mechanical slicer.

In the embodiment shown in FIG. 9A, fermented structure 190 is cut in a direction perpendicular to the long dimension of the strands thereof, to obtain a slice 192.

In the embodiment shown in FIG. 9B, fermented structure 190 is cut along the long dimension of the strands thereof, to obtain a slice 194.

Slices 192 and 194 each have a thickness dimension indicated by $T_c$, a height dimension indicated by $H_c$, and a width dimension indicated by $W_c$ in FIGS. 9A and 9B. The thickness $T_c$ is the dimension defined by the distance of the current slice from another slice, during the cutting process. In the embodiment of FIG. 9A, the thickness of slice 192 is along the longitudinal axes of the strands. In the embodiment of FIG. 9B, the thickness of slice 194 is perpendicular to the longitudinal axes of the strands.

In some embodiments, slice 192 or 194 has a thickness in the range of 1 mm to 50 mm, 1 mm to 40 mm, 1 mm to 30 mm, 1 mm to 25 mm, 2 mm to 25 mm, or 3 mm to 25 mm.

In some embodiments, slice 192 or 194 has a width dimension of at least 6 cm, at least 8 cm, at least 10 cm, or at least 12 cm.

In some embodiments, slice 192 or 194 has a height dimension in the range of 4 cm to 10 cm, in the range of 5 cm to 10 cm, in the range of 6 cm to 10 cm, or in the range of 6 cm to 8 cm.

Figure 9C:
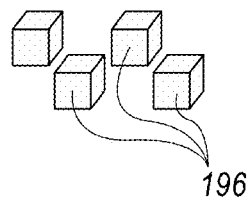

In some embodiments, the cutting at step 26 comprises cutting the fermented structure into chunks. For example, FIG. 9C shows fermented structure 190 cut into chunks resembling cubes 196.

Figure 9D:
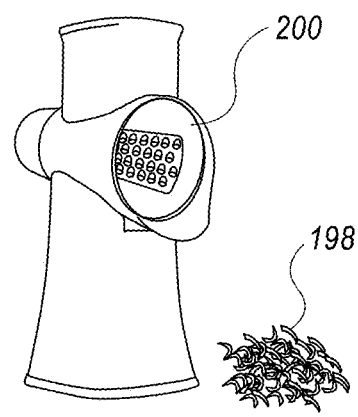

In some embodiments, the cutting at step 26 comprises shredding or pulling apart the fermented structure. For example, FIG. 9D shows fermented structure 190 shredded into a pile 198 of shreds, using a shredding device 200, such as a grater.

It will be appreciated that the steps of deactivation of the fermenting microorganism, addition of liquids, and cutting, may be performed in any suitable order.

The method illustrated in FIG. 1 results in a fermented protein-based meat analog, which includes protein strands and a fermenting microorganism or residue thereof. The fermenting microorganism may or may not be deactivated.

The protein strands of the fermented protein-based meat analog are held together by mycelium, typically deactivated mycelium. The mycelium is formed by the fermenting microorganism during the fermentation step.

In some embodiments, the residue of the fermenting microorganism may include one or more of deactivated mycelium, spores of the fermenting microorganism, DNA of the fermenting microorganism, or a component of a cell wall of the fermenting microorganism, such as ergosterol.

In some embodiments, in addition to the mycelium formed by the fermenting microorganism, components of the inoculum, other than the fermenting microorganism, the deactivated fermenting microorganism or residue thereof, may form part of the binding material binding the strands to one another.

In some embodiments, a fraction of a binding material within the meat analog is at most 15%, by weight. In some embodiments, the fraction of the binding material is at most 12% or at most 10% by weight.

Typically, any binding material utilized is scattered (e.g., randomly) within the meat analog, and is not in the form of layers.

In some embodiments, the meat analog is devoid of layers of binding material.

Figure 10:
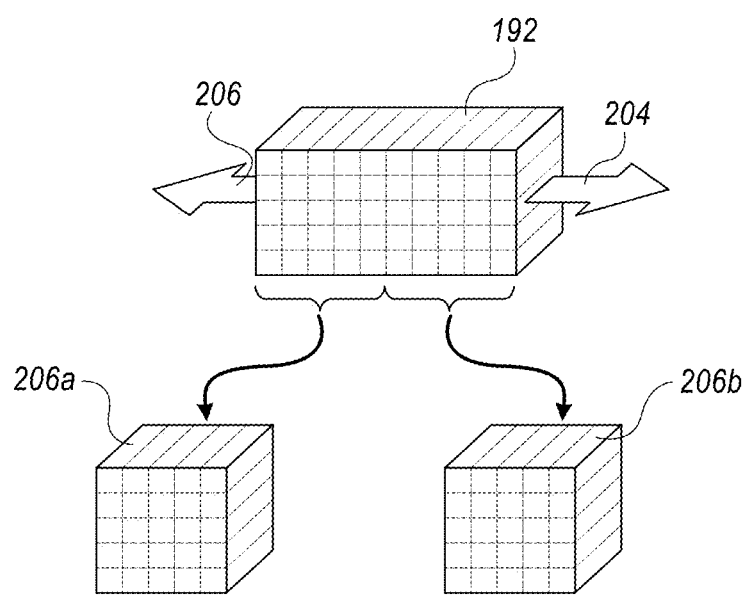
FIG. 10 is a schematic illustration of a point of fracturing of a fermented protein-based meat analog according to the disclosed technology, when force is applied thereto.

Reference is now made to FIG. 10, which is a schematic illustration of fracturing of a fermented structure according to the disclosed technology, when force is applied thereto.

As shown in FIG. 10, a slice of the fermented structure, here shown as slice 192 described hereinabove with respect to FIG. 9A, is pulled from opposing ends thereof, for example by a user applying substantially equal pulling forces in the directions of arrows 202 and 204. Typically, when sufficient tensile force is applied to the slice, the slice separates into two pieces, indicated as 206a and 206b. According to embodiments of the disclosed technology, the fermented meat analog is structured whereby, the mechanical failure in slice 192 occurs between protein strands of the slice, and also within the protein strands themselves.

Comparative evaluations were performed between low-moisture and high-moisture vegetable protein extrudates, utilizing the method of the present invention. As the high-moisture vegetable protein extrudate is characterized by high moisture and relatively low pore volume, its preparation did not include the impregnation and water removal steps. The samples were prepared so as to contain a nearly-identical weight percentage of water in the strands, prior to fermentation.

The finished products were evaluated using the texture profile analysis (TPA) method. Samples were compressed twice using a texture analyzer (Stable Micro Systems, TA.XTplusC) fitted with a 40 mm aluminum cylinder probe, which provides information pertaining to how samples behave when chewed (e.g., resistance to chewing) or to the restitution in dimensions of the material immediately after chewing.

The low-moisture extrudate (LME) based product exhibited TPA hardness that was 35 to 50% higher than the high-moisture extrudate (HME) based product. The LME based product exhibited TPA resilience, cohesion, springiness, and chewiness that exceeded those of the comparative HME based product by about 20%, 40%, 60%, and 220%, respectively.

Without wishing to be limited by theory, the inventors believe that the internal pore structure of the low-moisture extrudate, along with the moistening of the extrudate such that the moisture is absorbed by the protein/strand solids, but the pores are largely gas-filled, may enhance fermentation within the protein strands, and—significantly—provide a network of flow paths for the introduction of oxygen, for the removal of carbon dioxide, and for the removal of the generated heat (heat dissipation). This may be yet further enhanced by the fact that there exists a continuous pore structure along the length of the strand.

The inventors believe that the method of the present invention may greatly increase the production of mycelium within the protein strands, which may ultimately enhance the chewing experience.

In addition, the above-mentioned pores, when filled with gas during the initial stages of fermentation and subsequently filled with liquid, may appreciably contribute to the springiness and chewiness of the fermented product, and more generally, may provide a meat-like or steak-like texture to the final product. The inventors have found that the ability of the meat analog to hold liquid and to release the liquid in a sustained release, may be heavily dependent on this process.

Figure 11A:
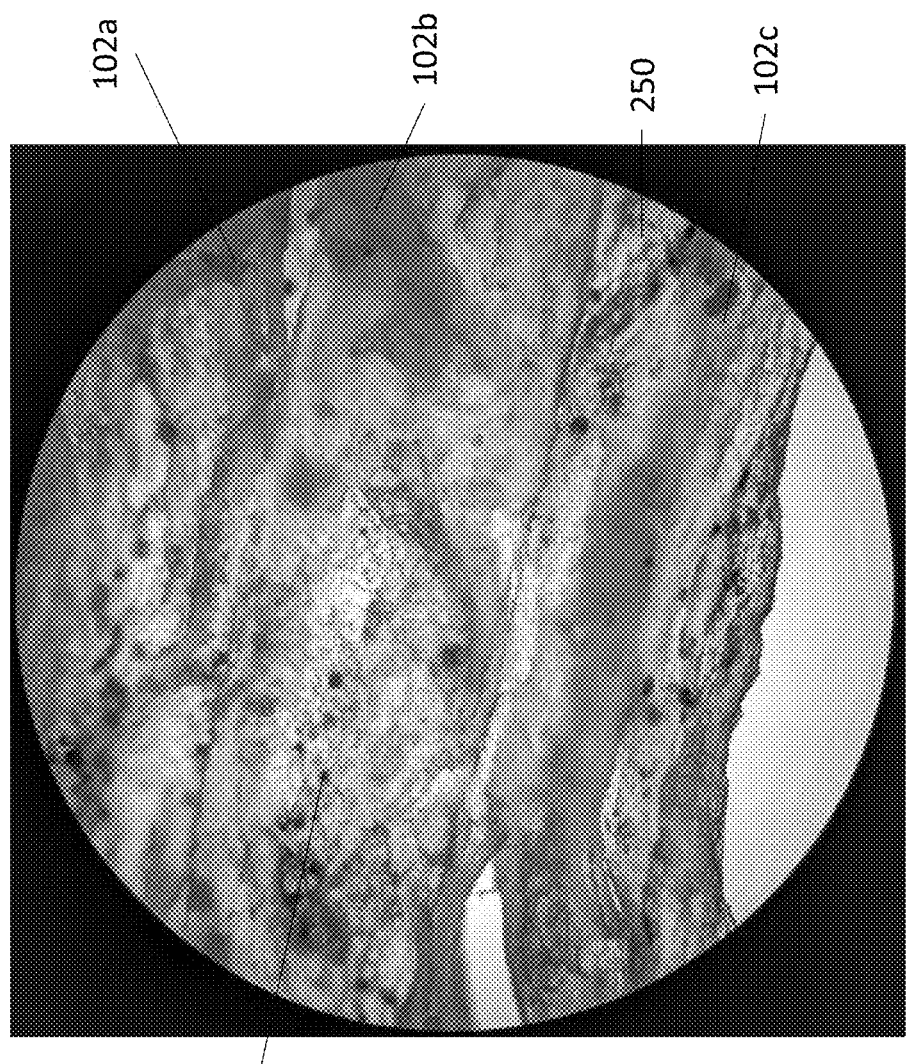
FIGS. 11A, 11B, and 11C are microscopy images of a fermented structure formed during manufacture of a fermented protein-based meat analog according to the disclosed technology.
Figure 11B:
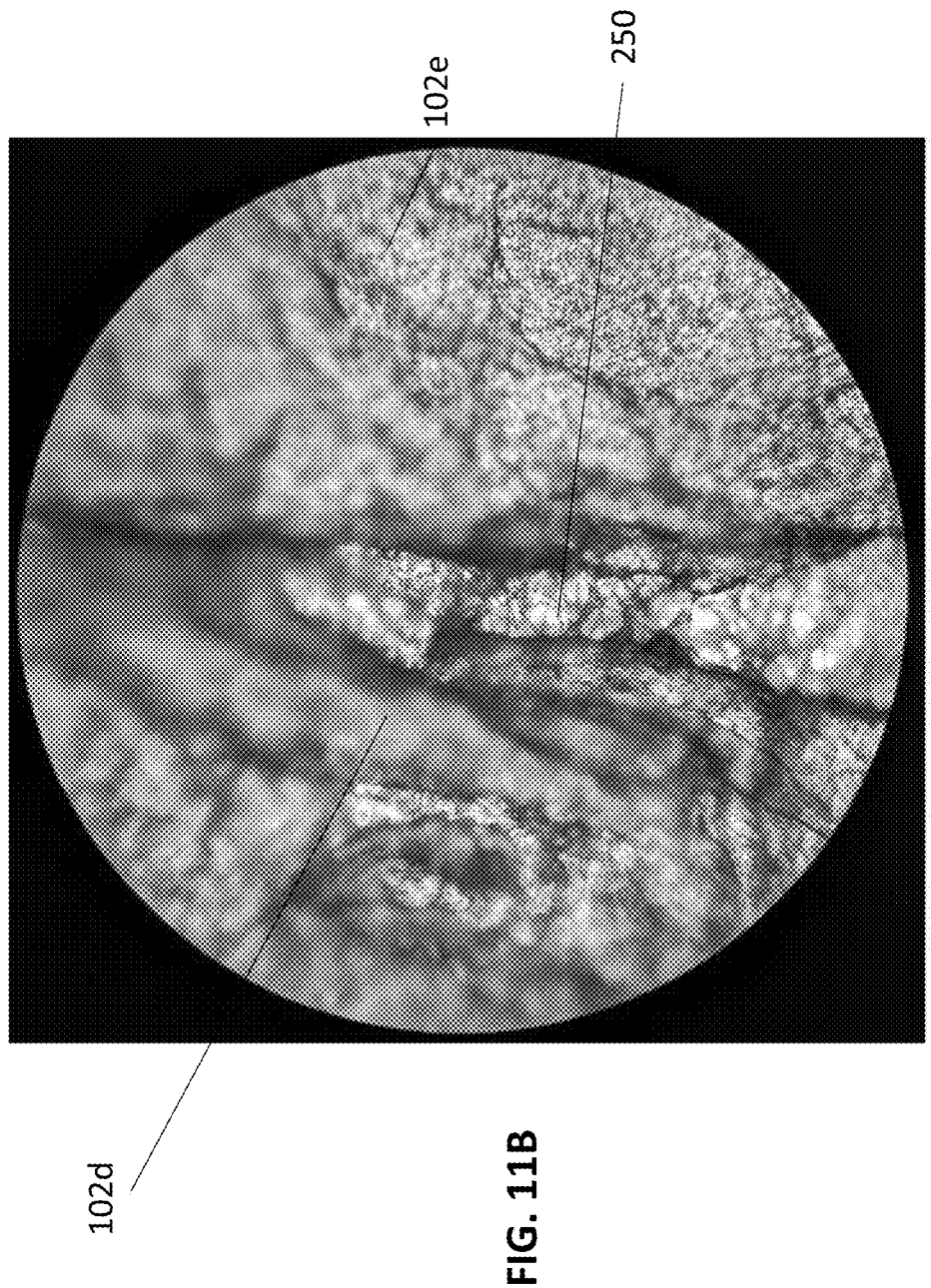
Figure 11C:
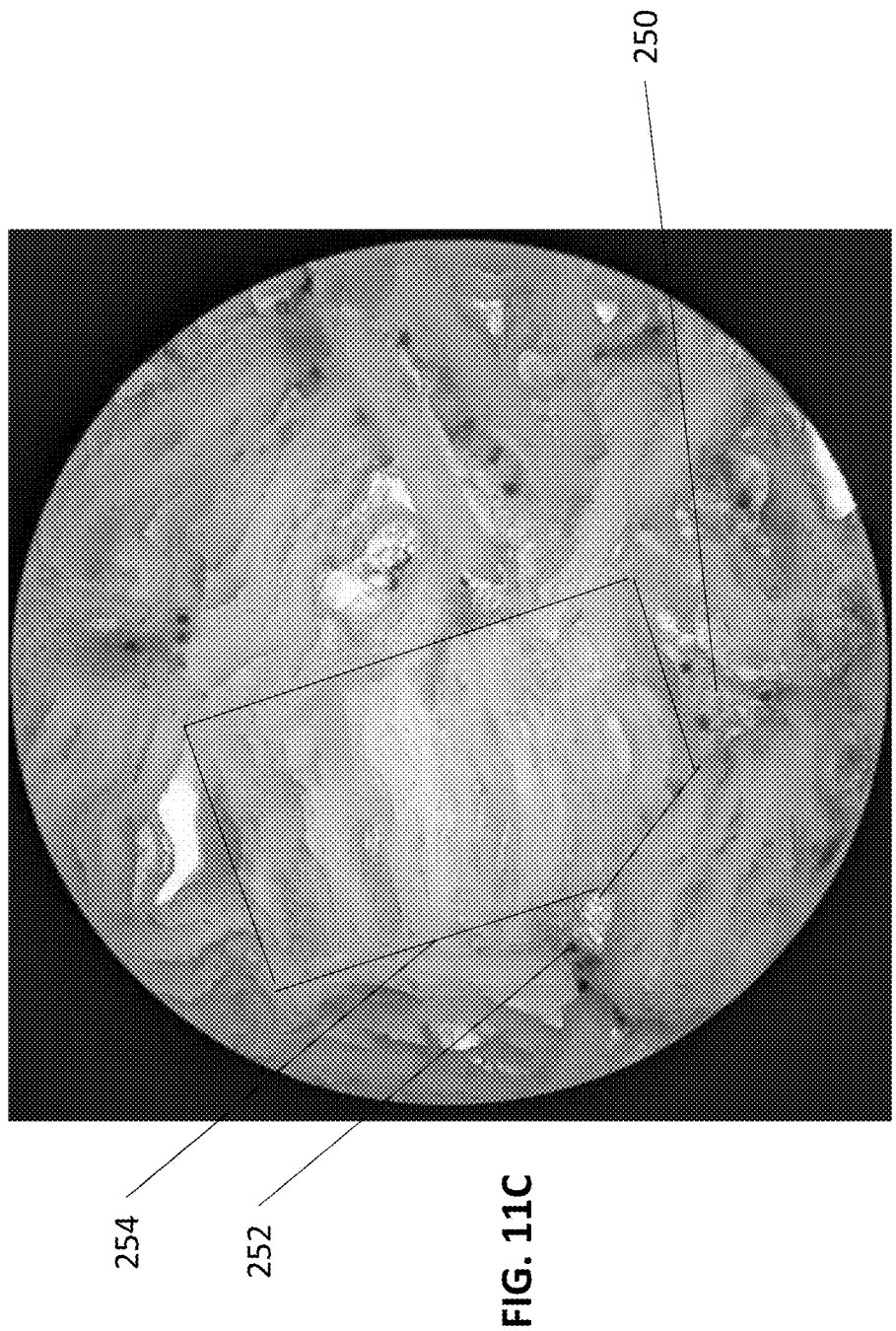

Reference is now made to FIGS. 11A, 11B, and 11C, which are microscopy images of a fermented structure formed during fermentation step 18 of the method of FIG. 1.

The images in FIGS. 11A to 11C were captured using an upright microscope, transilluminated with an LED light source included in the microscope. Samples were prepared by cutting thin slices of the fermented product with a scalpel, or with a deli-slicer, when the fermented product was frozen.

FIG. 11A shows a sample cut along the lengths of the protein strands, at a magnification of 40×. The photo shows three protein strands, labeled 102a, 102b, and 102c, running generally from left to right. The strands are connected to each other by mycelium, or hyphae, indicated by reference numeral 250. Spores of the fermenting microorganism appear as little black spheres 252 within the image.

FIG. 11B shows a sample cut along the lengths of the protein strands, at a magnification of 100×. The photo shows two protein strands, labeled 102d and 102e, running generally from top to bottom. The strands are connected to each other by mycelium, or hyphae, indicated by reference numeral 250. As seen, the mycelium is much clearer, and more developed, in the photo of FIG. 11B than in the Figure of photo 11A.

FIG. 11C shows a sample cut across the protein strand, at a magnification of 40×. A complete cross section of a protein strand is shown at reference numeral 254. As seen within the cross section of the strand, the protein strand may include a plurality of layers that may form a continuous pore structure along the strand or large length portions thereof. The strands are connected to each other by mycelium indicated by reference numeral 250. Spores of the fermenting microorganism appear as little black spheres 252 within the image.

Figure 12:
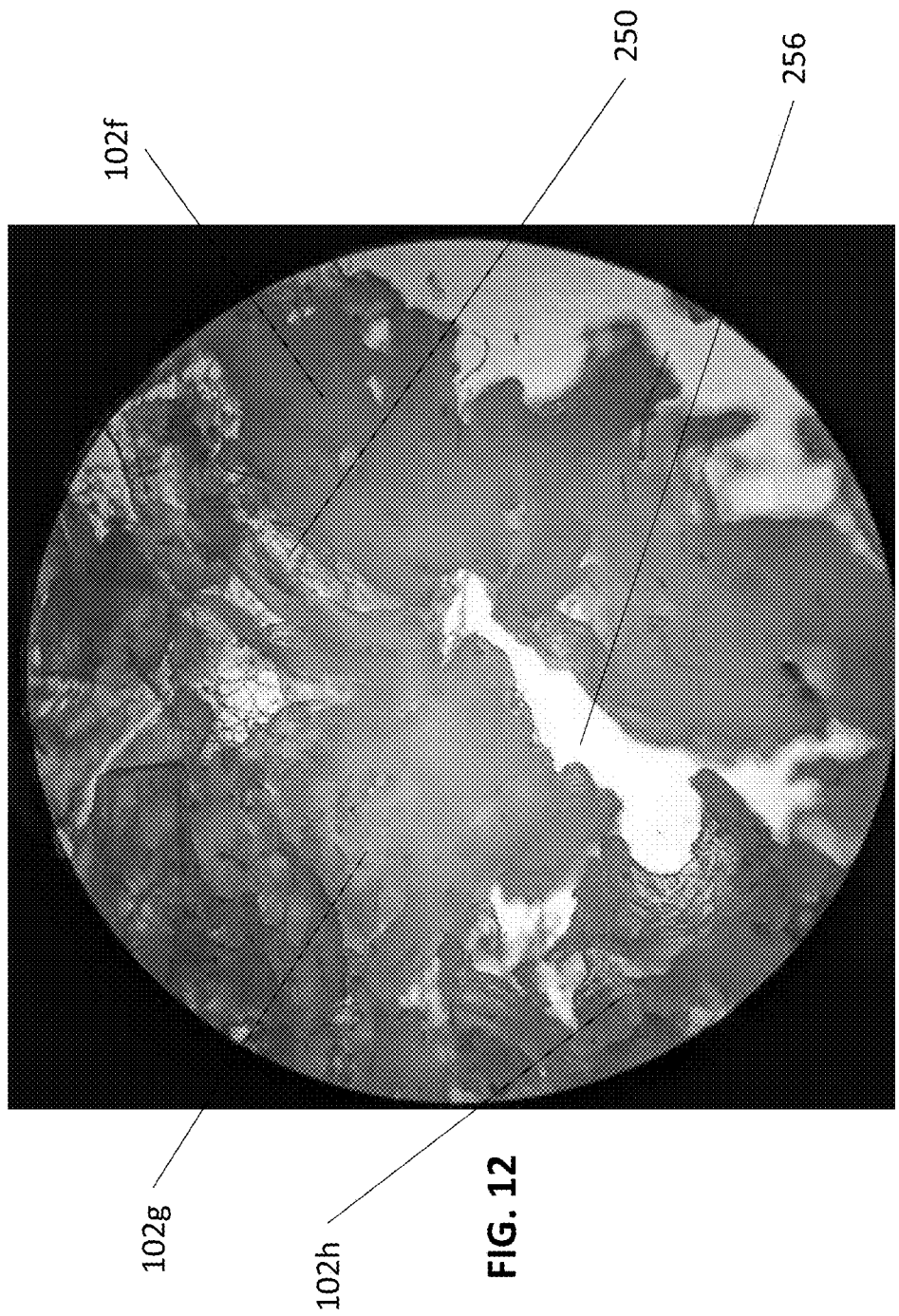
FIGS. 12 is a microscopy image of a fermented structure formed during manufacture of a fermented protein-based meat analog according to the disclosed technology.

FIG. 12 is a microscopy image of a fermented structure formed during fermentation step 18 of the method of FIG. 1, and following the deactivation step 22 of the method of FIG. 1.

The image in FIG. 12 was captured using an upright microscope, transilluminated with an LED light source included in the microscope. Samples were prepared by cutting thin slices of the fermented product with a scalpel, or with a deli-slicer, when the fermented product was frozen.

FIG. 12 shows a sample cut along the lengths of the protein strands, at a magnification of 40×. The photo shows three protein strands, labeled 102*f*, 102*g*, and 102*h*, running generally from left to right. The strands are connected to each other by mycelium, or hyphae, indicated by reference numeral 250. Additionally, following the deactivation step, voids are visible in the fermented structure, as indicated by reference numeral 256.

Figure 13A:
FIGS. 13A and 13B are microscopy images of a fermented protein-based meat analog according to the disclosed technology.
Figure 13B:

FIGS. 13A and 13B are microscopy images of a fermented protein-based meat analog according to the disclosed technology, following treatment thereof at step 24 of FIG. 1.

The images in FIGS. 13A and 13B were captured using an upright microscope, transilluminated with an LED light source included in the microscope. Samples were prepared by cutting thin slices of the fermented protein-based meat analog product with a scalpel, or with a deli-slicer, when the fermented protein-based meat analog was frozen.

FIG. 13A shows a sample cut along the lengths of the protein strands, at a magnification of 40×. The photo shows three protein strands, labeled 102*i*, 102*j*, and 102*k*, running generally from top to bottom. Comparison of FIG. 13A to FIG. 11A demonstrates that the color of the strands has changed, due to a coloring agent added to the fermented product. The strands are connected to each other by mycelium, or hyphae, indicated by reference numeral 250. Voids are visible in the fermented structure, as indicated by reference numeral 256.

FIG. 13B shows a sample cut along the lengths of the protein strands, at a magnification of 40×. The photo shows two protein strands, labeled 102*l* and 102*m*, running generally from top to bottom.

Figure 13C:
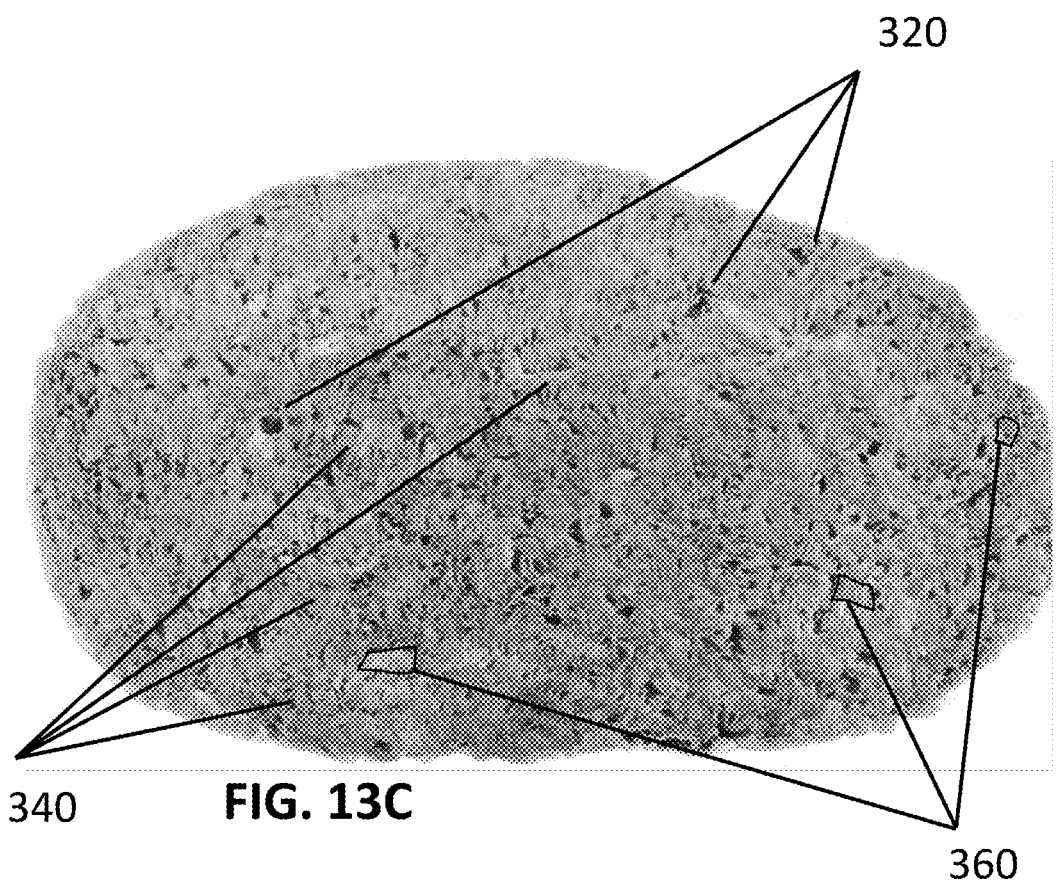
FIG. 13C provides a top view image of a slice of a meat analog product, according to the disclosed technology.
Figure 13D:
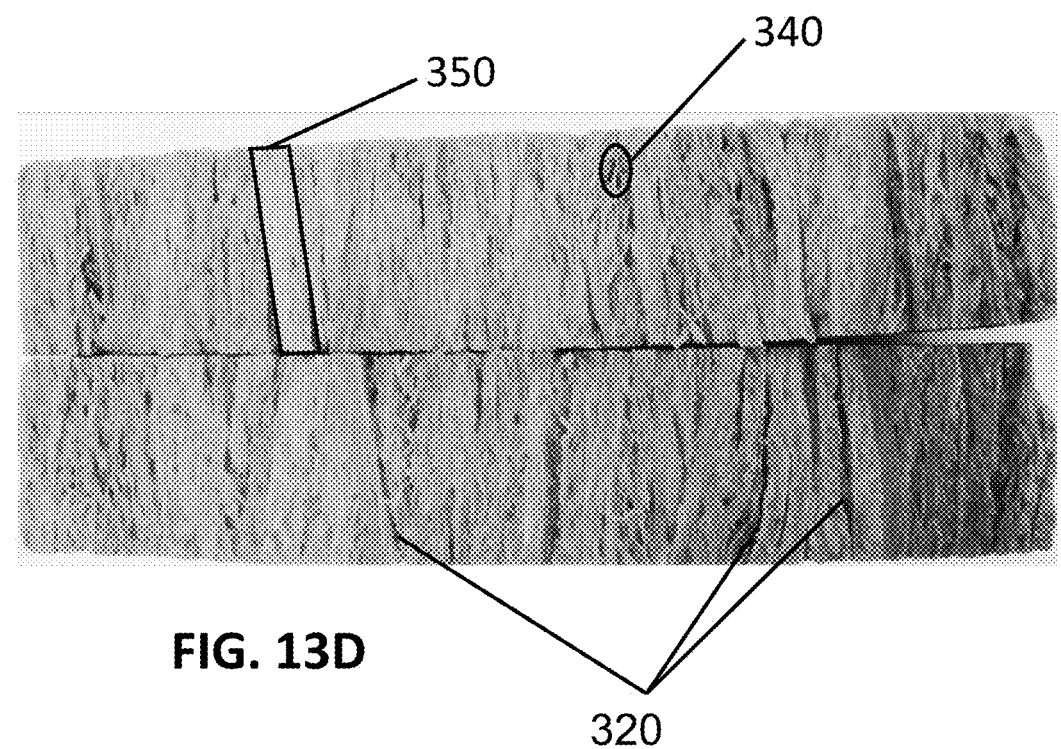
FIG. 13D provides a cross-sectional side view image of a slice of a meat analog product, according to the disclosed technology.

FIG. 13C provides a top view image of a slice of a meat analog product, according to the disclosed technology. On the exposed face of the slice may be seen inter-strand voids 320, intra-strand pores 340, and protein strand radial cross-sections 360. FIG. 13D provides a cross-sectional side view image of two slices of the meat analog product of FIG. 13C, which reveals strands such as strand 350, inter-strand voids 320, and intra-strand pores 340.

Figure 14A:
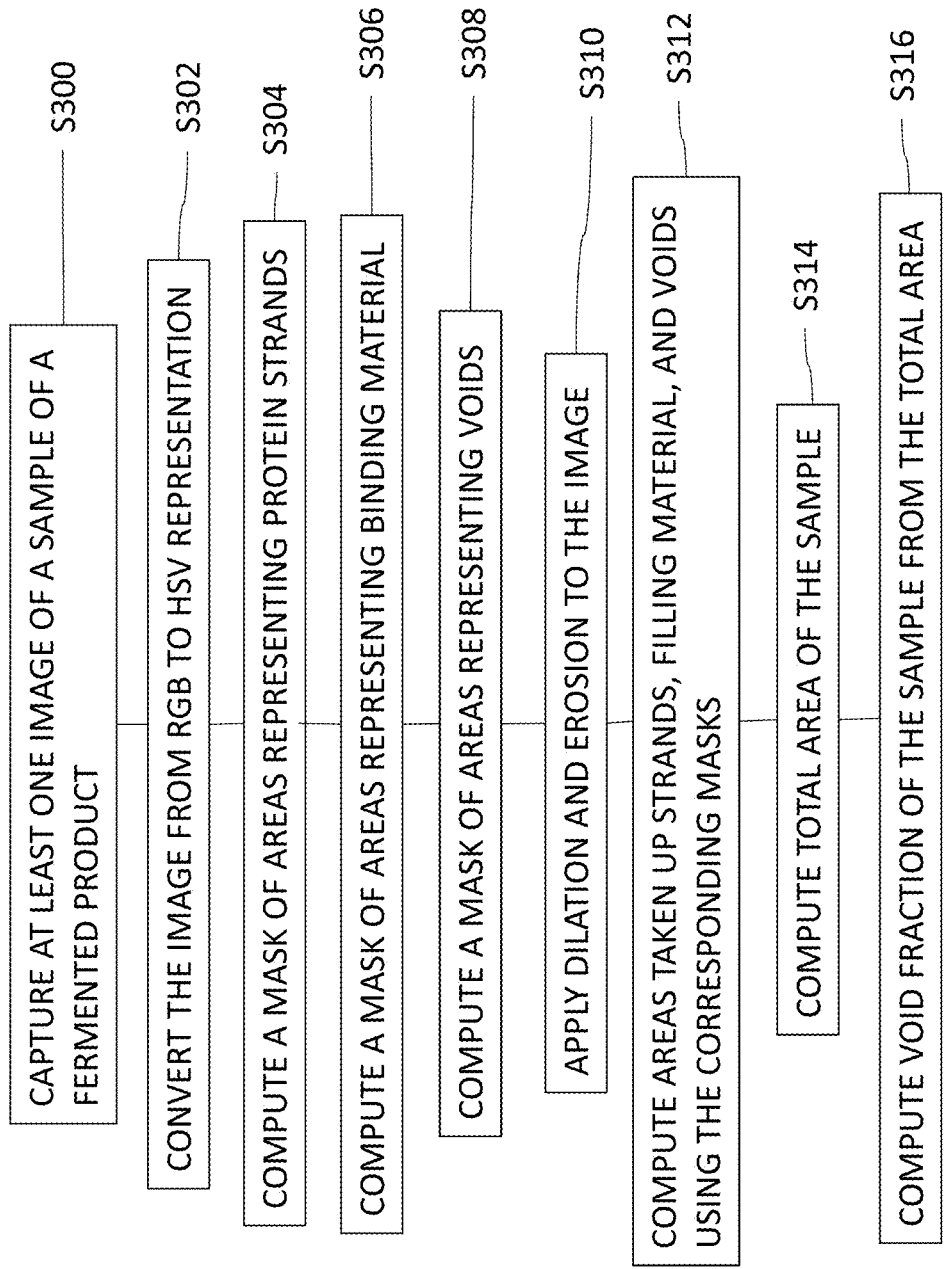
FIG. 14A is a flowchart of a method of determining the void fraction of a sample according to the disclosed technology.

Reference is now made to FIG. 14A, which is a flow chart of a first method of calculating a void percentage of a fermented structure using an image of the fermented structure ("image processing").

As seen at step S300, initially at least one image of a sample of the fermented product is captured. The image may be taken from the entire fermented product, or from a slice thereof. The image is captured from a direction substantially perpendicular to the longitudinal axis of the majority of the fibers.

An exemplary image of a sample 260 of a fermented structure according to the disclosed technology is shown in FIG. 14B.

If the image is represented as RGB (Red-Green-Blue) values, the image is converted to HSV (Hue-Saturation Value) at step S302.

At step S304, a plurality of masks of the image, including areas of the image representing protein strands, is computed using pre-determined saturation and intensity values for the protein strands. In some embodiments, the saturation and intensity values may be dependent on the chemical and physical properties of the protein-based from which the protein strands are formed.

The masks are calibrated based on quality, lighting, etc., and are generated by one of skill in the art, in accordance with good practice, so as to obtain representative results. The masks result in a black-and-white image that represents a segregation of a specific feature (e.g. strands, mycelium, voids) from the picture.

Similarly, at steps S306 and S308, masks of the image including areas of the image representing binding materials and voids between the strands, respectively, are computed using respective pre-determined saturation and intensity values for the binding materials and for the voids between the strands.

FIGS. 14C and 14D show exemplary masks 264 and 266 of the image of sample 260 shown in FIG. 14B, each computed using different pre-determined saturation and intensity values. The exemplary masks 264 and 266 are masks representing the protein strand in the sample.

At step S310, dilation and erosion may be applied to the masked image, to further refine the image and better define the morphology and the outline of the strands as shown therein. From the plurality of masks, the most suitable mask is selected, based on the greatest degree of similarity to the visible phases (typically as ascertained by the human eye) in the actual (original) sample image. By way of example, it may be evident from the figures that with respect to the masks of FIGS. 14C and 14D, that of FIG. 14C more closely matches the original image provided in FIG. 14B.

At step S312, the areas of the image taken up by each of the protein strands, the binding material, and the void are computed from the respective masks generated at steps S304, S306, and S308. The total area of the sample is computed at step S314.

At step S316, the void fraction in the sample may be computed by subtracting the area of the image taken up by the strands from the total area of the image. However, large pores within the strands, i.e., pores which are still visible to the naked human eye after the dilation and erosion are applied, are computed as part of the void area. Thus, the void fraction includes such large pores and voids that are visible to the naked eye, as well as voids that are blocked by mycelium, and may be represented by the relationship:

$$\text{VOID FRACTION (\%)} = 100 * (P_L + V_L + Vm)/A_T \qquad \text{(EQUATION I)}$$

where $P_L$ is the total area of the large pores, $V_L$ is the total area of the large voids, $Vm$ is the total area of large voids blocked with mycelium (not included in $V_L$), and $A_T$ is the total area of the image.

Alternatively or additionally, a second, "manual processing" method of calculating a void percentage of a fermented structure using an image of the fermented structure may be employed. The large pores and voids that are visible to the naked eye may be traced by hand or by using suitable software. The area of each of these pores and voids is calculated, and the total area is summed; the total area of the image is calculated, and Equation I may be used to determine the void fraction % of the manual processing method.

Alternatively or additionally, a second, "manual processing" method of calculating a void percentage of a fermented structure using an image of the fermented structure may be employed. The strands in the sample may be traced by hand or using suitable software. The area taken up by pores and voids along with mycelium (if any) is calculated by subtracting the area of the strands from the total area of the sample, such that the void fraction % of the sample can be calculated.

As used herein in the specification and in the claims section that follows, the term "void fraction", typically with reference to a bundle of strands, refers to the relationship provided in Equation I, and is determined by at least one of the above-provided processing methods.

For example, using the image of FIG. 14B and the masks of FIG. 14C and 14D, the void fraction in the sample is computed to be in the range of 14% for FIG. 14C, using the selected mask, and 24% for FIG. 14D, using the non-selected mask.

In some embodiments, the methods of the disclosed technology are suitable for obtaining a fibrous meat-like fermented protein-based meat analog, or meat analog, with many of the organoleptic properties of actual meat. The term "organoleptic" refers to any sensory properties of a product, such as taste, color, odor, and/or haptic feel. The meat analog has oriented strands, or fibers, that resemble the structure of cuts of meat like sirloin or chuck. In addition, the inventive method enables the manufacturer to control the composition of the meat analog, and to alter its organoleptic properties and/or nutritional properties, for example by modifications to the fermentation step or to the treatment step of the method of FIG. 1.

In some embodiments, the mold in which the protein strands are fermented is selected to provide part of the organoleptic properties of the meat analog. For example, the mold may have an ovoid cross section, having a major diameter and a minor diameter having a ratio in the range of 1:1 to 5:1. Such an ovoid mold provides a meat analog which is similar in its form to a meat cutlet.

In some embodiments, the inoculum may include agents to assist in creating, or enhancing, specific properties of the meat analog. For example, the inoculum may enable addition or removal of nutrients, aroma components, or flavor components, or may enable control, or modification, of properties of the meat analog, such as its texture, fat holding capacity, water holding capacity, palatability, color development before and during cooking, pH and nutritional values. Such modifications can also be achieved by appropriate selection of a fermentation protocol, or by inducing predefined biochemical reactions that result in specific properties.

Additional Embodiments

Additional Embodiments 1 to 349 are provided hereinbelow.

Embodiment 1. A method of manufacturing a fermented protein-based food item, the method comprising: (a) impregnating, with water, a protein-based substance containing at least 25% protein, by weight, on a dry basis, said protein-based substance including low-moisture extruded vegetable protein; (b) removing water from the protein-based substance; (c) producing protein strands from the protein-based substance, wherein said protein strands have a dimensionless aspect ratio ASP defined by:

$$ASP = L^2/Ax$$

wherein: L is the average length of the long dimension of said protein strands; and Ax is the average radial cross-sectional area of the strand dimensions, transverse to said long dimension; wherein ASP is at least 100; (d) inoculating the protein strands with an inoculum including a fermenting microorganism; (e) bundling the protein strands inoculated with the inoculum to produce at least one bundle of protein strands; (f) placing the bundle of protein strands in a fermentation housing; (g) subjecting the bundle of protein strands to fermentation in the fermentation housing to produce a fermented structure; and (h) optionally treating the fermented structure to produce the fermented protein-based food item.

Embodiment 2. The method of Embodiment 1, wherein L is at least 30 mm.

Embodiment 3. The method of Embodiment 1 or 2, wherein, within the bundle of protein strands, the long dimension of at least 80% of the protein strands is within 30 degrees of an imaginary longitudinal axis of the bundle.

Embodiment 4. The method of any one of Embodiments 1 to 3, wherein said impregnating and removing are performed such that the water content in the protein strands subjected to fermentation is within a range of 50 to 70%, by weight.

Embodiment 5. The method of any one of Embodiments 1 to 4, wherein said fermenting, microorganism is a fermenting, mycelium forming microorganism, and wherein said fermentation produces a fermented mycelium-containing structure.

Embodiment 6. The method of any one of Embodiments 1 to 5, further comprising treating the fermented structure to produce the food item.

Embodiment 7. The method of Embodiment 6, wherein the treating includes deactivating the fermenting microorganism.

Embodiment 8. The method of Embodiment 6 or 7, wherein the treating includes adding liquid to the fermented structure.

Embodiment 8A. The method of Embodiment 8, wherein the fermented structure includes a matrix formed by the deactivated fermenting microorganism or residue thereof and the protein strands absorbs the liquid, such that following the adding of the liquid, a water content of the food item is within a range of 50 to 85%, by weight.

Embodiment 8B. The method of Embodiment 8A, wherein the water content is at least 55%, by weight.

Embodiment 8C. The method of Embodiment 8A, wherein the water content is at least 60%, by weight.

Embodiment 8D. The method of any one of Embodiments 8 to 8C, wherein the water content of the fermented protein-based food item is at most 80%, by weight.

Embodiment 8E. The method of Embodiment 8D, wherein the water content of the fermented protein-based food item is at most 75%, by weight.

Embodiment 9. The method of Embodiment 6, wherein the treating includes deactivating the fermenting microorganism and adding liquid to the fermented structure.

Embodiment 10. The method of any one of Embodiments 8 through 9, wherein the deactivating is performed prior to the adding.

Embodiment 11. The method of any one of Embodiments 8 through 9, wherein the deactivating is performed following the adding.

Embodiment 12. The method of any one of Embodiments 6 to 11, wherein the treating includes cutting the fermented structure.

Embodiment 13. The method of Embodiment 12, wherein the cutting is performed prior to the adding.

Embodiment 14. The method of Embodiment 12, wherein the cutting is performed following the adding.

Embodiment 15. The method of any one of the previous Embodiments, wherein the treating includes deactivating the fermenting microorganism and cutting the fermented structure.

Embodiment 16. The method of Embodiment 15, wherein the deactivating is performed prior to the cutting.

Embodiment 17. The method of Embodiment 15, wherein the deactivating is performed following the cutting.

Embodiment 18. The method of any one of the previous Embodiments, further comprising, prior to the treating, removing the fermented structure from the fermentation housing.

Embodiment 19. The method of any one of the previous Embodiments, the at least one bundle dimensioned such that the fermented structure has a minimal dimension of at least 3 cm.

Embodiment 19A. The method of Embodiment 19, wherein the at least one bundle is dimensioned such that the minimal dimension is at least 3.2 cm, at least 3.5 cm, at least 3.8 cm, at least 4 cm, at least 4.5 cm, at least 5 cm, at least 6 cm, or at least 7 cm.

Embodiment 19B. The method of Embodiment 19 or 19A, wherein the minimal dimension of the fermented plant-protein based food item is at most 20 cm.

Embodiment 19C. The method of Embodiment 19B, wherein the minimal dimension of the fermented plant-protein based food item is at most 9 cm.

Embodiment 20. The method of any one of the preceding Embodiments, wherein a matrix formed by i) the deactivated fermenting microorganism or ii) a residue thereof, and the protein strands, absorbs the added liquid.

Embodiment 21. The method of any one of the preceding Embodiments, wherein the added liquid includes an aqueous liquid.

Embodiment 22. The method of Embodiment 21, wherein said adding of said aqueous liquid to the fermented structure is performed such that the aqueous liquid comprises 15 to 60%, by weight of the fermented product, prior to the adding.

Embodiment 23. The method of any one of the preceding Embodiments, further comprising adding a fat-containing or lipophilic liquid to the fermented structure, wherein the fat-containing or lipophilic comprises 1 to 20%, by weight, of the fermented product, prior to its being added.

Embodiment 24. The method of any one of the previous Embodiments, wherein the protein-based substance contains at least 30%, 40%, or 50% protein by weight on a dry basis.

Embodiment 25. The method of any one of the previous Embodiments, wherein the protein of the protein-based substance includes, predominantly includes, or consists essentially of the plant protein.

Embodiment 26. The method of any one of the previous Embodiments, wherein the obtaining comprises obtaining a piece of the protein-based substance, and cutting the piece into the strands.

Embodiment 27. The method of any one of the previous Embodiments, wherein the obtaining comprises extruding to produce the strands of the protein-based substance.

Embodiment 28. The method of any one of the previous Embodiments, wherein the fermentation housing comprises at least one of a rigid mold, a flexible mold, a tray, a bag, and an envelope.

Embodiment 29. The method of any one of the previous Embodiments, wherein the fermentation housing comprises a film, and the enveloping or placing comprises wrapping the film around the bundle to at least partially envelop the bundle.

Embodiment 30. The method of any one of the previous Embodiments, wherein the fermentation housing is permeable to flow of gas therethrough.

Embodiment 31. The method of any one of the previous Embodiments, wherein, prior to the bundling, an average length L of a long dimension of the strands is at least 15 mm.

Embodiment 32. The method of Embodiment 31, wherein L is at least 20 mm.

Embodiment 33. The method of Embodiment 31, wherein L is at least 40 mm.

Embodiment 34. The method of Embodiment 31, wherein L is at least 70 mm.

Embodiment 35. The method of Embodiment 31, wherein L is at least 100 mm.

Embodiment 36. The method of Embodiment 31, wherein L is at least 150 mm.

Embodiment 37. The method of Embodiment 31, wherein L is at least 250 mm.

Embodiment 38. The method of Embodiment 31, wherein L is at least 400 mm.

Embodiment 39. The method of any one of Embodiments 31 to 38, wherein L is at most 1000 mm.

Embodiment 40. The method of Embodiment 39, wherein L is at most 700 mm.

Embodiment 41. The method of any one of the previous Embodiments, wherein ASP is at least 150.

Embodiment 42. The method of Embodiment 41, wherein ASP is at least 250.

Embodiment 43. The method of Embodiment 41, wherein ASP is at least 500.

Embodiment 44. The method of Embodiment 41, wherein ASP is at least 1,000.

Embodiment 45. The method of Embodiment 41, wherein ASP is at least 2,000.

Embodiment 46. The method of Embodiment 41, wherein ASP is at least 3,000.

Embodiment 47. The method of Embodiment 41, wherein ASP is at least 5,000.

Embodiment 48. The method of Embodiment 41, wherein ASP is at least 8,000.

Embodiment 49. The method of Embodiment 41, wherein ASP is at least 15,000.

Embodiment 50. The method of Embodiment 41, wherein ASP is at least 50,000.

Embodiment 51. The method of Embodiment 41, wherein ASP is at least 100,000.

Embodiment 52. The method of any one of Embodiments 41 to 51, wherein ASP is at most 5,000,000.

Embodiment 53. The method of Embodiment 52, wherein ASP is at most 1,000,000.

Embodiment 54. The method of any one of the preceding Embodiments, wherein Ax is within a range of 1 $mm^2$ to 100 $mm^2$.

Embodiment 55. The method of Embodiment 54, wherein Ax is within a range of 1 $mm^2$ to 60 $mm^2$.

Embodiment 56. The method of Embodiment 54 or 55, wherein Ax is at most 40 $mm^2$.

Embodiment 57. The method of Embodiment 56, wherein Ax is at most 30 $mm^2$.

Embodiment 58. The method of Embodiment 56, wherein Ax is at most 20 $mm^2$.

Embodiment 59. The method of Embodiment 56, wherein Ax is at most 12 $mm^2$.

Embodiment 60. The method of Embodiment 56, wherein Ax is at most 8 $mm^2$.

Embodiment 61. The method of Embodiment 56, wherein Ax is at most 5 $mm^2$.

Embodiment 62. The method of Embodiment 56, wherein Ax is at most 3.5 $mm^2$.

Embodiment 63. The method of Embodiment 56, wherein Ax is at most 3 mm².

Embodiment 64. The method of Embodiment 56, wherein Ax is at most 2.5 mm².

Embodiment 65. The method of any one of the preceding Embodiments, wherein the inoculating is performed layer-by-layer, prior to the bundling.

Embodiment 66. The method of Embodiment 65, wherein the inoculating of each layer comprises scattering the inoculum over one side of the layer.

Embodiment 67. The method of Embodiment 65 or 66, wherein the inoculating of each layer comprises blowing the inoculum onto the strands of the layer.

Embodiment 68. The method of any one of Embodiments 65 to 67, wherein the inoculating of each layer comprises spraying a liquid suspension including the inoculum onto the strands of the layer.

Embodiment 69. The method of any one of Embodiments 65 to 68, wherein the inoculating of each layer comprises dipping the strands of the layer in a liquid suspension including the inoculum.

Embodiment 70. The method of any one of the preceding Embodiments, wherein the inoculating comprises inoculating the protein strands, following the bundling.

Embodiment 71. The method of Embodiment 1 or any one of Embodiments 3 to 108, wherein the inoculating comprises at least one of: blowing the inoculum onto the strands, into or onto the bundle or into or onto the protein-based substance; spraying a liquid suspension including the inoculum onto the strands, the bundle, or the protein-based substance, and dipping the protein-based substance, the strands, or the bundle in a liquid suspension including the inoculum.

Embodiment 72. The method of any one of the previous Embodiments, wherein said inoculating is performed on a single layer of the protein strands.

Embodiment 73. The method of any one of the previous Embodiments, wherein said inoculating is performed on at least a first layer of the protein strands.

Embodiment 74. The method of any one of the preceding Embodiments, wherein, within the bundle of strands, the longitudinal axes of at least 85%, at least 90%, or at least 95% of the strands are within 30 degrees of the longitudinal axis of the bundle.

Embodiment 75. The method of any one of the previous Embodiments wherein, prior to the subjecting, the bundle of protein strands has a bulk density within a range of 0.35 to 0.85 g/cm³.

Embodiment 76. The method of Embodiment 75, wherein the bulk density is at most 0.8 g/cm³.

Embodiment 77. The method of Embodiment 76, wherein the bulk density is at most 0.75 g/cm³.

Embodiment 78. The method of Embodiment 76, wherein the bulk density is at most 0.70 g/cm³.

Embodiment 79. The method of Embodiment 76, wherein the bulk density is at most 0.65 g/cm³.

Embodiment 80. The method of Embodiment 76, wherein the bulk density is at most 0.60 g/cm³.

Embodiment 81. The method of Embodiment 76, wherein the bulk density is at most 0.55 g/cm³.

Embodiment 82. The method of any one of Embodiments 75 to 81, wherein the bulk density is at least 0.40 g/cm³.

Embodiment 83. The method of Embodiment 82, wherein the bulk density is at least 0.45 g/cm³.

Embodiment 84. The method of Embodiment 82, wherein the bulk density is at least 0.50 g/cm³.

Embodiment 85. The method of any one of the previous Embodiments, wherein said removing of the water is performed such that at least a portion of the total pore volume of the pores within the protein strands is filled with gas.

Embodiment 86. The method of any one of the previous Embodiments, wherein the portion of the total pore volume filled with gas is at least 20%.

Embodiment 87. The method of Embodiment 86, wherein the portion of the total pore volume filled with gas is at least 50%.

Embodiment 88. The method of Embodiment 86, wherein the portion of the total pore volume filled with gas is at least 80%.

Embodiment 89. The method of any one of the previous Embodiments, wherein said pores include visible pores that are visible to the naked human eye, wherein most of said visible pores are devoid of water.

Embodiment 90. The method of any one of the previous Embodiments, wherein in a longitudinal cross-section of said protein strands taken along said long dimension of said protein strands, the cross-sectional area of said visible pores is 5 to 30% of the total cross-sectional area of said cross-section.

Embodiment 92. The method of Embodiment 91, wherein the cross-sectional area of said visible pores is 5 to 25%, 5 to 18%, or 7 to 15% of the total cross-sectional area.

Embodiment 93. The method of any one of the previous Embodiments, wherein the specific gravity of the protein strands subjected to fermentation is within a range of 0.45 to 0.75.

Embodiment 94. The method of of any one of the previous Embodiments, wherein said low-moisture extruded vegetable protein contains at most 15% water, by weight.

Embodiment 95. The method of any one of the previous Embodiments, wherein said fermentation is performed utilizing natural aeration.

Embodiment 95A. The method of any one of the previous Embodiments, wherein the smallest dimension of said bundle of protein strands is at least 55 mm.

Embodiment 96. The method of any one of the previous Embodiments, wherein said removing water from the protein-based substance is performed by a solid-liquid separation driven by pressure or by vacuum.

Embodiment 97. The method of any one of the previous Embodiments, wherein said low-moisture extruded vegetable protein is texturized vegetable protein.

Embodiment 98. The method of any one of the previous Embodiments, wherein, while subjecting said bundle of protein strands to fermentation, before said treating, the fermented structure has a void fraction of at most 30%, said void fraction calculated on a radial cross-section transverse to the longitudinal axis of the bundle.

Embodiment 99. The method of Embodiment 98, wherein said void fraction is at most 25%.

Embodiment 100. The method of Embodiment 98, wherein said void fraction is at most 20%.

Embodiment 101. The method of Embodiment 98, wherein said void fraction is at most 15%.

Embodiment 102. The method of Embodiment 98, wherein said void fraction is at most 12%.

Embodiment 103. The method of any one of Embodiments 98 to 102, wherein said void fraction is at least 4%.

Embodiment 104. The method of Embodiment 102, wherein said void fraction is at least 6%.

Embodiment 105. The method of any one of the previous Embodiments, wherein the specific gravity of the fermented protein-based food item is higher by at least 0.05 with respect to said protein strands of step (c).

Embodiment 106. The method of Embodiment 105, wherein the specific gravity of the fermented protein-based food item is higher by at least 0.10 with respect to said protein strands of step (c).

Embodiment 107. The method of Embodiment 105, wherein the specific gravity of the fermented protein-based food item is higher by at least 0.15 with respect to said protein strands of step (c).

Embodiment 108. The method of Embodiment 105, wherein the specific gravity of the fermented protein-based food item is higher by at least 0.20 with respect to said protein strands of step (c).

Embodiment 109. The method of Embodiment 105, wherein the specific gravity of the fermented protein-based food item is higher by at least 0.25 with respect to said protein strands of step (c).

Embodiment 110. The method of any one of the previous Embodiments, wherein, following said inoculating, through said subjecting the bundle of protein strands to fermentation, the process is performed without mixing of the protein strands.

Embodiment 111. The method of any one of the previous Embodiments, wherein said inoculating is performed such that a colony forming unit (CFU) count of said fermenting microorganism on a particular protein strand of the protein strands, with respect to the cumulative nominal surface area of said particular protein strand, is at most 3,500 CFU/cm$^2$.

Embodiment 112. The method of Embodiment 111, wherein said CFU count is at most 2,500 CFU/cm$^2$.

Embodiment 113. The method of Embodiment 111, wherein said CFU count is at most 1,200 CFU/cm$^2$.

Embodiment 114. The method of Embodiment 111, wherein said CFU count is at most 900 or 700 CFU/cm$^2$.

Embodiment 115. The method of any one of Embodiments 111 to 114, wherein the CFU count is at least 120 CFU/cm$^2$.

Embodiment 116. The method of Embodiments 115, wherein the CFU count is at least 250 CFU/cm$^2$.

Embodiment 117. The method of any one of the previous Embodiments, wherein the specific gravity of the protein-based substance, prior to said impregnating, is within a range of 0.2 to 0.7.

Embodiment 118. The method of Embodiment 117, wherein this specific gravity is at most 0.65.

Embodiment 119. The method of Embodiment 117, wherein this specific gravity is at most 0.6.

Embodiment 120. The method of Embodiment 117, wherein this specific gravity is at most 0.55.

Embodiment 121. The method of any one of Embodiments 117 to 121, wherein this specific gravity is at least 0.25.

Embodiment 122. The method of Embodiment 121, wherein this specific gravity is at least 0.3 or 0.35.

Embodiment 123. The method of any one of the previous Embodiments, wherein, prior to the subjecting, the bundle of protein strands has a water activity of at least 0.6.

Embodiment 124. The method of Embodiment 123, wherein the water activity is at least 0.65, at least 0.7, or at least 0.75.

Embodiment 125. The method of any one of the preceding Embodiments, wherein the liquid includes an aqueous liquid.

Embodiment 126. The method of Embodiment 125, wherein the aqueous liquid has a weight within a range of 15 to 50%, by weight of the fermented product, prior to the adding of the liquid.

Embodiment 127. The method of Embodiment 125, wherein the aqueous liquid has a weight within a range of 20 to 45%, by weight of the fermented product, prior to the adding of the liquid.

Embodiment 128. The method of Embodiment 125, wherein the aqueous liquid has a weight within a range of 25 to 40%, by weight of the fermented product, prior to the adding of the liquid.

Embodiment 129. The method of any one of the preceding Embodiments, wherein the liquid comprises a liquid containing fat.

Embodiment 130. The method of Embodiment 129, wherein the liquid containing the fat has a weight within a first weight range of 1 to 20%, by weight of the fermented product, prior to the adding of the liquid.

Embodiment 131. The method of Embodiment 130, wherein the first weight range is 1 to 15%.

Embodiment 132. The method of Embodiment 130, wherein the first weight range is 1 to 12%.

Embodiment 133. The method of Embodiment 130, wherein the first weight range is 1 to 8%.

Embodiment 134. The method of Embodiment 130, wherein the first weight range is 2 to 8%.

Embodiment 135. The method of Embodiment 130, wherein the first weight range is 3 to 8%.

Embodiment 136. The method of Embodiment 130, wherein the first weight range is 3 to 6%.

Embodiment 137. The method of Embodiment 130, wherein the first weight range is 3 to 5%.

Embodiment 138. The method of any one of the preceding Embodiments, wherein the liquid containing the fat comprises a hydrophobic liquid.

Embodiment 139. The method of any one of the preceding Embodiments, wherein the liquid containing the fat comprises a lipophilic liquid.

Embodiment 140. The method of any one of the preceding Embodiments, wherein the liquid containing the fat comprises at least 30% fat, by weight.

Embodiment 141. The method of Embodiment 141, wherein the liquid containing the fat comprises at least 50% fat, by weight.

Embodiment 142. The method of Embodiment 141, wherein the liquid containing the fat comprises at least 75% fat, by weight.

Embodiment 143. The method of Embodiment 141, wherein the liquid containing the fat comprises at least 90% fat, by weight.

Embodiment 144. The method of any one of Embodiments 140 to 143, wherein the liquid containing the fat comprises at most 95% fat, by weight.

Embodiment 145. The method of any one of the preceding Embodiments, wherein the added liquid includes a coloring agent.

Embodiment 146. The method of any one of the preceding Embodiments, wherein the cutting comprises slicing the fermented structure or the fermented protein-based food item into slices.

Embodiment 147. The method of Embodiment 146, wherein the slicing is performed whereby a slice of the fermented plant-protein based food item has a thickness of at least 1 mm and at most 50 mm, at most 40 mm, at most 30 mm, or at most 25 mm.

Embodiment 148. The method of Embodiment 147, wherein the slicing is performed whereby a slice of the fermented plant-protein based food item has a thickness of at least 2 mm or at least 3 mm.

Embodiment 149. The method of any one of Embodiment 146 to 148, wherein the slicing is performed whereby a slice of the fermented plant-protein based food item has a width dimension of at least 6 cm.

Embodiment 150. The method of Embodiment 149, wherein width dimension is at least 8 cm, at least 10 cm, or at least 12 cm.

Embodiment 151. The method of Embodiment 149 or 150, wherein width dimension is at most 20 cm or at most 15 cm.

Embodiment 152. The method of any one of Embodiments 146 to 151, wherein the slicing is performed whereby a slice of the fermented plant-protein based food item has a height dimension of at least 4 cm.

Embodiment 153. The method of Embodiment 152, wherein the slicing is performed whereby the height dimension is at least 5 cm or at least 6 cm.

Embodiment 154. The method of Embodiment 152 or 153, wherein the slicing is performed whereby the height dimension is at most 12 cm, at most 10 cm, at most 8 cm, or at most 7 cm.

Embodiment 155. The method of any one of the previous Embodiments, wherein the food item comprises a meat analog.

Embodiment 156. The method of any one of the previous Embodiments, wherein the food item comprises a steak analog.

Embodiment 157. The method of any one of the previous Embodiments, wherein the water content in the protein strands subjected to fermentation is within a range of 52 to 65%, by weight.

Embodiment 158. The method of any one of the previous Embodiments, wherein the strand dimensions transverse to said long dimension are characterized by a shortest transverse length $L_S$, and a longest transverse length $L_L$, wherein a dimensionless aspect ratio $L_L/L_S$ is at least 2.5:1.

Embodiment 159. The method of Embodiment 158, wherein $L_L/L_S$ is at most 20:1.

Embodiment 160. The method of of any one of previous Embodiments, wherein in a longitudinal cross-section of said protein strands taken along said long dimension of said protein strands, the cross-sectional area of said visible pores is 5 to 30% of the total cross-sectional area of said cross-section, while in a second longitudinal cross-section of said protein strands taken along said long dimension of said protein strands, the cross-sectional area of said visible pores at most 1% or at most 0.5% of the total cross-sectional area of said cross-section.

Embodiment 250. A fermented meat analog, comprising:
fermented protein strands, the longitudinal axes of at least 80% of said fermented protein strands optionally being within 30 degrees of an imaginary longitudinal axis, said fermented protein strands having a dimensionless aspect ratio $ASP_{PROD}$ defined by:

$$ASP_{PROD} = L^2/Ax$$

wherein:
L is the average length of said fermented protein strands, each individual strand length taken along the longitudinal axis thereof; and Ax is the average radial cross-sectional area of said fermented protein strands;
wherein $ASP_{PROD}$ is at least 8; and
a mycelium of a fermenting microorganism, disposed within said fermented protein strands and therebetween, such that hyphae of said mycelium mechanically bind together the fermented protein strands to form the fermented meat analog.

Embodiment 251. The meat analog of Embodiment 250, wherein the fermented meat analog contains a plurality of pores disposed within said fermented protein strands, said pores having at least one of the following two structural features: (i) the pores have a short dimension of at least 0.05 mm, and (ii) the pores are visible to the naked eye.

Embodiment 252. The meat analog of Embodiment 251, wherein, within a longitudinal cross-section along the long dimension of said fermented protein strands, the pores make up 5 to 25% of the total area of said longitudinal cross-section.

Embodiment 253. The meat analog of Embodiment 251 or 252, wherein a short dimension of the pores is at least 0.05 mm.

Embodiment 254. The meat analog of any one of Embodiments 250 to 253, wherein the pores are visible to the naked eye.

Embodiment 255. The meat analog of any one of Embodiments 250 to 254, wherein a void fraction within a second, radial cross-section of the meat analog, taken perpendicular to said longitudinal cross-section, is within a range of 5 to 20 area % of the total area of the radial cross-section.

Embodiment 256. The meat analog of Embodiment 255, wherein the void fraction makes up 5 to 18% of the total area.

Embodiment 257. The meat analog of Embodiment 255, wherein the void fraction makes up 7 to 15% of the total area.

Embodiment 258. The meat analog of any one of the preceding Embodiments, wherein water makes up 40% to 85% of the meat analog, by weight.

Embodiment 259. The meat analog of Embodiment 258, wherein the water content is at least 45%.

Embodiment 260. The meat analog of Embodiment 258, wherein the water content is at least 50%.

Embodiment 261. The meat analog of Embodiment 258, wherein the water content is at least 55%.

Embodiment 262. The meat analog of Embodiment 258, wherein the water content is at least 60%, and optionally, at most 80%

Embodiment 263. The meat analog of any one of the preceding Embodiments, wherein the fat content of the meat analog, is at most 35%.

Embodiment 264. The meat analog of Embodiment 263, wherein the fat content is at most 25% at most 20% or at most 15%.

Embodiment 265. The meat analog of any one of the previous Embodiments, wherein the fat content is at least 1% or at least 2%.

Embodiment 266. The meat analog of Embodiment 262, wherein the fat content is at least 3%.

Embodiment 266. The meat analog of any one of the preceding Embodiments, wherein the longitudinal axes of at least 80% of said fermented protein strands are within 30 degrees of an imaginary longitudinal axis.

Embodiment 267. The fermented meat analog of any one of the preceding Embodiments, wherein a total weight concentration of adhesives and chemical binding agents of the fermented meat analog is at most 10%.

Embodiment 268. The fermented meat analog of Embodiment 267, wherein the total weight concentration is at most 5% or at most 3%.

Embodiment 269. The fermented meat analog of Embodiment 267, wherein the fermented meat analog is substantially devoid of said adhesives and chemical binding agents.

Embodiment 270. The fermented meat analog of any one of Embodiments 250 to 269, wherein the fermented meat analog is a meat slab analog having a minimal dimension of at least 3 cm.

Embodiment 271. The fermented meat analog of Embodiment 270, wherein said minimal dimension is within a range of 4.5 to 25 cm.

Embodiment 272. The fermented meat analog of Embodiment 270, wherein said minimal dimension is at least 5 cm.

Embodiment 273. The fermented meat analog of Embodiment 270, wherein said minimal dimension is at least 6 cm.

Embodiment 274. The fermented meat analog of Embodiment 270, wherein said minimal dimension is at least 6.5 cm.

Embodiment 275. The fermented meat analog of Embodiment 270, wherein said minimal dimension is at least 7 cm.

Embodiment 276. The fermented meat analog of any one of Embodiments 270 to 274, wherein $ASP_{PROD}$ is within a range of 350 to 100,000.

Embodiment 277. The meat analog of any one of the preceding Embodiments, wherein the fermented meat analog being structured whereby, when sufficient tensile force to effect a mechanical failure is applied at opposing ends of the meat analog, a separation of the meat analog into pieces occurs within and between the protein strands.

Embodiment 278. The meat analog of any one of the preceding Embodiments, wherein the fermenting microorganism is a deactivated fermenting microorganism.

Embodiment 279. The meat analog of any one of the preceding Embodiments, further comprising a residue of the fermenting microorganism or the deactivated fermenting microorganism.

Embodiment 280. The meat analog of Embodiment 279, wherein the residue includes spores of the fermenting microorganism or the deactivated fermenting microorganism.

Embodiment 281. The meat analog of any one of Embodiments 278 to 280, wherein at least one of the deactivated fermenting microorganism and the residue includes DNA of the fermenting microorganism or the deactivated fermenting microorganism.

Embodiment 282. The meat analog of any one of Embodiments 278 to 281, wherein at least one of the deactivated fermenting microorganism and the residue includes a component of a cell wall of the fermenting microorganism.

Embodiment 283. The meat analog of Embodiment 282, wherein the component of the cell wall comprises ergosterol.

Embodiment 284. The meat analog of any one of the previous Embodiments, wherein the protein strands contain at least 25% protein, by weight, on a dry basis.

Embodiment 285. The meat analog of Embodiment 284, wherein the protein strands contain at least 30% protein, by weight, on a dry basis.

Embodiment 286. The meat analog of Embodiment 284, wherein the protein strands contain at least 40% protein, by weight, on a dry basis.

Embodiment 287. The meat analog of Embodiment 284, wherein the protein strands contain at least 50% protein, by weight, on a dry basis.

Embodiment 288. The meat analog of any one of the previous Embodiments, wherein the protein strands contain at least 40 to 90% protein, by weight, on a dry basis.

Embodiment 289. The meat analog of any one of the previous Embodiments, wherein the protein strands include textured vegetable protein.

Embodiment 290. The meat analog of any one of the previous Embodiments, wherein the protein strands have a maximal dimension, in a cross section of a longitudinal axis thereof, in the range of 0.5 mm to 5 mm.

Embodiment 291. The meat analog of any one of the previous Embodiments, wherein an average length of a longitudinal dimension of the strands is at least 1 mm.

Embodiment 292. The meat analog of Embodiment 291, wherein the average length is at least 3 mm.

Embodiment 293. The meat analog of Embodiment 291, wherein the average length is at least 4 mm.

Embodiment 294. The meat analog of Embodiment 291, wherein the average length is at least 5 mm.

Embodiment 295. The meat analog of Embodiment 291, wherein the average length is at least 8 mm.

Embodiment 296. The meat analog of Embodiment 291, wherein the average length is at least 10 mm.

Embodiment 297. The meat analog of Embodiment 291, wherein the average length is at least 15 mm.

Embodiment 298. The meat analog of Embodiment 291, wherein the average length is at least 20 mm.

Embodiment 299. The meat analog of Embodiment 291, wherein the average length is at least 50 mm.

Embodiment 300. The meat analog of Embodiment 291, wherein the average length is at least 100 mm.

Embodiment 301. The meat analog of Embodiment 291, wherein the average length is at least 250 mm.

Embodiment 302. The meat analog of Embodiment 291, wherein the average length is at most 700 mm.

Embodiment 303. The meat analog of Embodiment 291, wherein the average length is at most 450 mm.

Embodiment 304. The meat analog of any one of the previous Embodiments, wherein $ASP_{PROD}$ is at least 10.

Embodiment 305. The meat analog of any one of the previous Embodiments, wherein $ASP_{PROD}$ is at least 15.

Embodiment 306. The meat analog of any one of the previous Embodiments, wherein $ASP_{PROD}$ is at least 25.

Embodiment 307. The meat analog of any one of the previous Embodiments, wherein $ASP_{PROD}$ is at least 50.

Embodiment 308. The meat analog of any one of the previous Embodiments, wherein $ASP_{PROD}$ is at least 60.

Embodiment 309. The meat analog of any one of the previous Embodiments, wherein $ASP_{PROD}$ is at least 80.

Embodiment 310. The meat analog of any one of the previous Embodiments, wherein $ASP_{PROD}$ is at least 100.

Embodiment 311. The meat analog of any one of the previous Embodiments, wherein $ASP_{PROD}$ is at least 200.

Embodiment 312. The meat analog of any one of the previous Embodiments, wherein $ASP_{PROD}$ is at least 300.

Embodiment 313. The meat analog of any one of the previous Embodiments, wherein $ASP_{PROD}$ is within a range of 350 to 35,000.

Embodiment 314. The meat analog of any one of the previous Embodiments, wherein $ASP_{PROD}$ is at most 20,000.

Embodiment 315. The meat analog of Embodiment 314, wherein $ASP_{PROD}$ is at most 1,000.

Embodiment 316. The meat analog of Embodiment 314, wherein $ASP_{PROD}$ is at most 400.

Embodiment 317. The meat analog of any one of the previous Embodiments, wherein the meat analog is a slice of a meat analog slab.

Embodiment 318. The meat analog of Embodiment 317, wherein the slice is a steak.

Embodiment 319. The meat analog of any one of the previous Embodiments, wherein the meat analog is a meat slab, and wherein $ASP_{PROD}$ is at least 1,000.

Embodiment 320. The meat slab of Embodiment 319, wherein $ASP_{PROD}$ is at least 1,500.

Embodiment 321. The meat slab of Embodiment 319, wherein $ASP_{PROD}$ is at least 2,000.

Embodiment 322. The meat slab of Embodiment 319, wherein $ASP_{PROD}$ is at least 2,500.

Embodiment 323. The meat slab of Embodiment 319, wherein $ASP_{PROD}$ is at least 3,000.

Embodiment 324. The meat slab of Embodiment 319, wherein $ASP_{PROD}$ is at least 4,000.

Embodiment 325. The meat slab of Embodiment 319, wherein $ASP_{PROD}$ is at least 5,000.

Embodiment 326. The meat slab of Embodiment 319, wherein $ASP_{PROD}$ is at least 6,000.

Embodiment 327. The meat slab of Embodiment 319, wherein $ASP_{PROD}$ is at least 8,000.

Embodiment 328. The meat analog of any one of the previous Embodiments, wherein $ASP_{PROD}$ is at most 100,000.

Embodiment 329. The meat analog of Embodiment 328, wherein $ASP_{PROD}$ is at most 50,000.

Embodiment 330. The meat analog of Embodiment 328, wherein $ASP_{PROD}$ is at most 20,000.

Embodiment 331. The meat analog of any one of the previous Embodiments, wherein Ax is within a range of 2 mm$^2$ to 60 mm$^2$.

Embodiment 332. The meat analog of Embodiment 331, wherein Ax is within a range of 3 mm$^2$ to 30 mm$^2$, 3 mm$^2$ to 15 mm$^2$, 2 mm$^2$ to 7 mm$^2$, or 3 mm$^2$ to 5 mm$^2$.

Embodiment 333. The meat analog of any one of the preceding Embodiments, wherein a matrix formed by the protein strands and mycelium of the fermenting microorganism absorbs liquid therein, and wherein a total liquid content of the meat analog is in the range of 50 to 88%, by weight.

Embodiment 334. The meat analog of Embodiment 333, wherein the total liquid content is in the range of 55 to 88%, by weight.

Embodiment 335. The meat analog of Embodiment 333, wherein the total liquid content is in the range of 60 to 85%, by weight.

Embodiment 336. The meat analog of Embodiment 333, wherein the total liquid content is in the range of 60 to 80%, by weight.

Embodiment 337. The meat analog of Embodiment 333, wherein the total liquid content is in the range of 60 to 75%, by weight.

As used herein in the specification and in the claims section that follows, the term "water activity" of a food, or a raw material thereof (e.g., a bundle of strands) refers to the ratio between the vapor pressure of the food itself, when in a completely undisturbed balance (equilibrium) with the surrounding air media, and the vapor pressure of distilled water under identical conditions (including temperature and pressure).

As used herein in the specification and in the claims section that follows, the term "mycelium" is used generally as used in the art. For the avoidance of doubt, "mycelium" refers to both living mycelium and non-living ("deactivated") mycelium structures or forms, and is meant to include the fungal-DNA containing, residual filamentous structures resulting from the deactivation of living mycelium.

The mycelium contains, or consists essentially of hyphae, each hypha having a long, branching, filamentous structure.

As used herein in the specification and in the claims section that follows, the term "natural aeration" is meant to exclude the forced introduction of air, oxygen and the like into the fermentation housing, e.g., by means of tubes. The term "natural aeration" is meant to include convection of air, oxygen, and the like in the environment surrounding the fermentation housing.

As used herein in the specification and in the claims section that follows, the term "average length", typically with reference to a plurality of strands or a bundle of strands, refers to the arithmetic mean of the length of each individual strand within the respective plurality of strands or bundle of strands, i.e., the sum of the length of each individual strand ($\Sigma L_i$) divided by the number of individual strands (N).

While the length of each individual strand along its longitudinal axis may vary slightly (the end face may not be perpendicular to the longitudinal axis), the length may be taken as the maximal length of the strand along its longitudinal axis.

As used herein in the specification and in the claims section that follows, the term "longitudinal axis", with reference to a strand, refers to the axis representing the longest dimension (length) of the strand.

As used herein in the specification and in the claims section that follows, the term "longitudinal axis", with reference to a plurality of strands, a bundle of strands, a fermented meat analog and the like containing such strands, and the like, refers to an imaginary axis generally disposed in the longitudinal (or "axial") direction of the strands, the exact direction of which is determined by setting to zero the sum of each strand's deviation from the imaginary axis.

As used herein in the specification and in the claims section that follows, the term "radial cross-section", and the like, with respect to an object such as a strand, a bundle of strands, a fermented meat analog, and the like, refers to a plane perpendicular to, and radially intersecting, the longitudinal axis of the object. This radial intersection generally forms the smallest cross-sectional area of the object. Specifically for the fermented meat analog, when sliced across the longitudinal direction of the strands, the term "radial cross-section" refers to a cross-section taken across the longitudinal axis of the strands. Similarly, the term "radial cross-sectional area" refers to the area of such a radial cross-section. These terms may be best understood from FIG. 2, in which the smallest cross-sectional area of the strand, Ax, is in a plane that radially intersects the longitudinal axis of the strand, which runs along the long dimension Ls of the strand, and has a designated length L.

As used herein in the specification and in the claims section that follows, the term "cumulative surface area" refers to the cumulative nominal surface area and is calculated by computing the area of all faces of the strand, by measuring its sides with an appropriate measuring device (in a generally rectangular strand, there are 6 such sides), and assuming smooth surfaces.

As used herein in the specification and in the claims section that follows, the term "length", with reference to a meat analog slab, meat analog slice, steak (cut) analog, and the like, refers to the dimension in the general direction of the fibers within the slab, slice or cut.

As used herein in the specification and in the claims section that follows, the terms "width" and "height", with reference to a meat analog slab, meat analog slice, steak analog, and the like, refers to the two remaining Cartesian dimensions after "length" has been determined, with "width" being assigned to the larger of the two remaining dimensions and "height" being assigned to the smaller of the two remaining dimensions.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of manufacturing a fermented protein-based food item, the method comprising:
    a. impregnating, with water, a protein-based substance containing at least 25% protein, by weight, on a dry basis, said protein-based substance including low-moisture extruded vegetable protein;
    b. removing water from the protein-based substance;
    c. producing protein strands from the protein-based substance, wherein said protein strands have a dimensionless aspect ratio ASP defined by:

$$ASP = L^2/Ax$$

wherein:
      L is the average length of the long dimension of said protein strands; and
      Ax is the average radial cross-sectional area of the strand dimensions;
    wherein ASP is at least 100, and wherein L is at least 30 mm;
    and wherein said protein strands have pores;
    d. inoculating the protein strands with an inoculum including a fermenting, mycelium forming microorganism;
    e. bundling the protein strands inoculated with the inoculum to produce a bundle of protein strands;
    f. placing the bundle of protein strands in a fermentation housing;
    g. subjecting the bundle of protein strands to fermentation in the fermentation housing to produce a fermented mycelium-containing structure; and
    h. treating the fermented structure to produce the fermented protein-based food item;
    wherein, within the bundle of protein strands, the long dimension of at least 80% of the protein strands is within 30 degrees of a longitudinal axis of the bundle;
    wherein said impregnating and removing are performed such that the water content in the protein strands subjected to fermentation is within a range of 50 to 70%, by weight;
    wherein said removing of the water is performed such that at least a portion of the total pore volume of the pores within the protein strands is filled with gas;
    wherein said pores include visible pores that are visible to the naked human eye,
    wherein in a longitudinal cross-section of said protein strands taken along said long dimension of said protein strands, the cross-sectional area of said visible pores is 5 to 30% of the total cross-sectional area of said cross-section;
    wherein the specific gravity of the protein strands subjected to fermentation is within a range of 0.45 to 0.75;
    and wherein the specific gravity of the fermented protein-based food item is higher by at least 0.15 with respect to said protein strands of step c.

2. The method of claim 1, wherein most of said visible pores are devoid of water.

3. The method of claim 1, wherein said low-moisture extruded vegetable protein contains at most 15% water, by weight.

4. The method of claim 1, wherein the cross-sectional area of said visible pores is 5 to 18% of said total cross-sectional area.

5. The method of claim 1, wherein, while subjecting said bundle of protein strands to fermentation, before said treating, the fermented structure has a void fraction of at most 20%, said void fraction calculated on a radial cross-section transverse to the longitudinal axis of the bundle.

6. The method of claim 1, wherein the specific gravity of the protein-based substance, prior to said impregnating, is within a range of 0.2 to 0.7.

7. A method of manufacturing a fermented protein-based food item, the method comprising:
    a. impregnating, with water, a protein-based substance containing at least 25% protein, by weight, on a dry basis, said protein-based substance including low-moisture extruded vegetable protein;
    b. removing water from the protein-based substance;
    c. producing protein strands from the protein-based substance, wherein said protein strands have a dimensionless aspect ratio ASP defined by:

$$ASP = L^2/Ax$$

wherein:
      L is the average length of the long dimension of said protein strands; and
      Ax is the average radial cross-sectional area of the strand dimensions;
    wherein ASP is at least 100, and wherein L is at least 30 mm;
    and wherein said protein strands have pores;
    d. inoculating the protein strands with an inoculum including a fermenting, mycelium forming microorganism;
    e. bundling the protein strands inoculated with the inoculum to produce a bundle of protein strands;
    f. placing the bundle of protein strands in a fermentation housing;
    g. subjecting the bundle of protein strands to fermentation in the fermentation housing to produce a fermented mycelium-containing structure; and h. treating the fermented structure to produce the fermented protein-based food item;
wherein, within the bundle of protein strands, the long dimension of at least 80% of the protein strands is within 30 degrees of a longitudinal axis of the bundle;
and wherein said impregnating and removing are performed such that the water content in the protein strands subjected to fermentation is within a range of 50 to 70%, by weight.

8. The method of claim 7, wherein said removing of the water is performed such that at least a portion of the total pore volume of the pores within the protein strands is filled with gas.

9. The method of claim 8, wherein said pores include visible pores that are visible to the naked human eye, and wherein most of said visible pores are devoid of water.

10. The method of claim 9, wherein in a longitudinal cross-section of said protein strands taken along said long dimension of said protein strands, the cross-sectional area of said visible pores is 5 to 30% of the total cross-sectional area of said cross-section.

11. The method of claim 10, wherein said removing water from the protein-based substance is performed by a solid-liquid separation driven by pressure or by vacuum.

12. The method of claim 9, wherein the specific gravity of the protein strands subjected to fermentation is within a range of 0.45 to 0.75.

13. The method of claim 7, wherein said fermentation is performed utilizing natural aeration, and wherein the smallest dimension of said bundle of protein strands is at least 55 mm.

14. The method of claim 7, wherein the protein of the protein-based substance predominantly includes cross-linked protein.

15. A method of manufacturing a fermented protein-based food item, the method comprising:
a. impregnating, with water, a protein-based substance containing at least 25% protein, by weight, on a dry basis, said protein-based substance including low-moisture extruded vegetable protein;
b. removing water from the protein-based substance, subsequent to said impregnating;
c. producing protein strands from the protein-based substance, after said removing water, wherein said protein strands have a dimensionless aspect ratio ASP defined by:

$$ASP = L^2/Ax$$

wherein:
L is the average length of the long dimension of said protein strands; and
Ax is the average radial cross-sectional area of the strand dimensions;
wherein ASP is at least 100, and wherein L is at least 30 mm;
and wherein said protein strands have pores;
d. inoculating the protein strands with an inoculum including a fermenting, mycelium forming microorganism;
e. bundling the protein strands inoculated with the inoculum to produce a bundle of protein strands;
f. placing the bundle of protein strands in a fermentation housing;
g. subjecting the bundle of protein strands to fermentation in the fermentation housing to produce a fermented mycelium-containing structure; and
h. treating the fermented structure to produce the fermented protein-based food item;
wherein, within the bundle of protein strands, the long dimension of at least 80% of the protein strands is within 30 degrees of a longitudinal axis of the bundle;
wherein said impregnating and removing are performed such that the water content in the protein strands subjected to fermentation is within a range of 50 to 70%, by weight;
wherein the protein of the protein-based substance predominantly includes denatured protein.

16. The method of claim 15, wherein the protein-based substance is a low moisture extruded vegetable protein.

17. The method of claim 16, wherein said low-moisture extruded vegetable protein includes textured vegetable protein.

18. The method of claim 15, further comprising heating a vegetable protein source to at least 120° C., effecting denaturing thereof, and producing said low-moisture extruded vegetable protein.

19. The method of claim 15, wherein said removing water from the protein-based substance is performed by a pressure differential based solid-liquid separation.

20. The method of claim 19, wherein the protein of the protein-based substance predominantly includes cross-linked protein.

* * * * *